(12) United States Patent
Mori et al.

(10) Patent No.: US 9,182,571 B2
(45) Date of Patent: Nov. 10, 2015

(54) WIDE-ANGLE IMAGING LENS AND IMAGING APPARATUS

(71) Applicant: FUJIFILM Corporation, Tokyo (JP)

(72) Inventors: Masao Mori, Saitama-ken (JP); Ryoko Otomo, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/274,103

(22) Filed: May 9, 2014

(65) Prior Publication Data

US 2014/0340767 A1  Nov. 20, 2014

(30) Foreign Application Priority Data

May 20, 2013  (JP) ................................ 2013-105760

(51) Int. Cl.
*G02B 9/60* (2006.01)
*G02B 13/00* (2006.01)
*G02B 9/34* (2006.01)
*G02B 13/04* (2006.01)

(52) U.S. Cl.
CPC ............... *G02B 13/004* (2013.01); *G02B 9/34* (2013.01); *G02B 13/04* (2013.01)

(58) Field of Classification Search
CPC .. G02B 13/0045; G02B 13/004; G02B 13/04; G02B 9/34; G02B 9/60
See application file for complete search history.

(56) References Cited

U.S. PATENT DOCUMENTS 8,134,787 B2 *  3/2012  Saitoh ........................... 359/753

FOREIGN PATENT DOCUMENTS

| CN | 102289052 | 12/2011 |
| CN | 102289053 | 12/2011 |
| JP | 4625711 | 2/2011 |
| JP | 5064154 | 10/2012 |

* cited by examiner

*Primary Examiner* — Joseph P Martinez
(74) *Attorney, Agent, or Firm* — Young & Thompson

(57) ABSTRACT

An imaging lens is composed of a first lens having a negative meniscus shape with a convex surface on the object side, a negative second lens, a positive third lens, an aperture stop, a negative fourth lens, and a positive fifth lens disposed in order from the object side. The fourth and the fifth lens are cemented with an interface which is convex on the object side and has an aspherical shape. If the radius of curvature is taken as R9 and the focal length of the entire system is taken as f, the imaging lens satisfies a conditional expression given below:

$$1.0 < R9/f \quad (1).$$

19 Claims, 12 Drawing Sheets

EXAMPLE 1

EXAMPLE 3

EXAMPLE 4

EXAMPLE 5

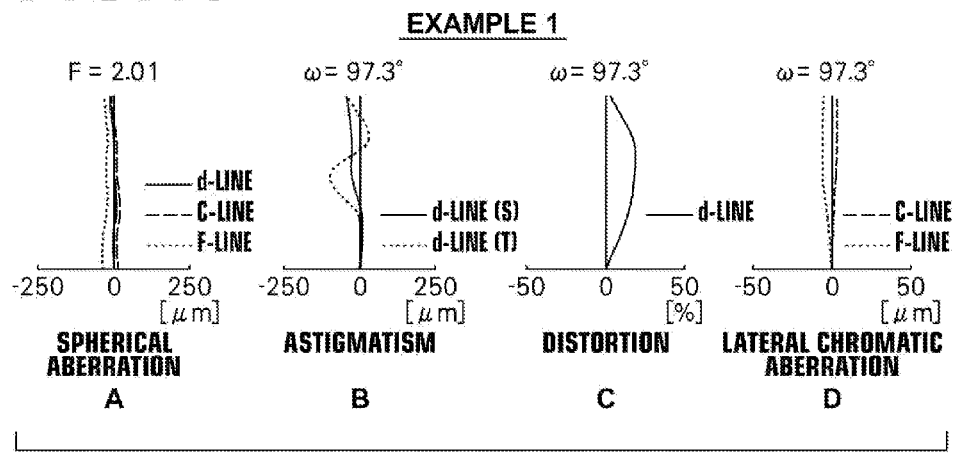
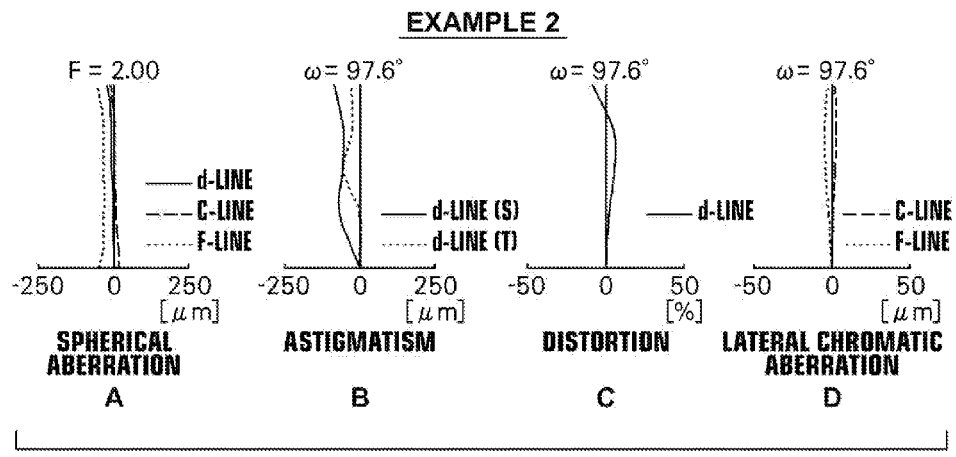

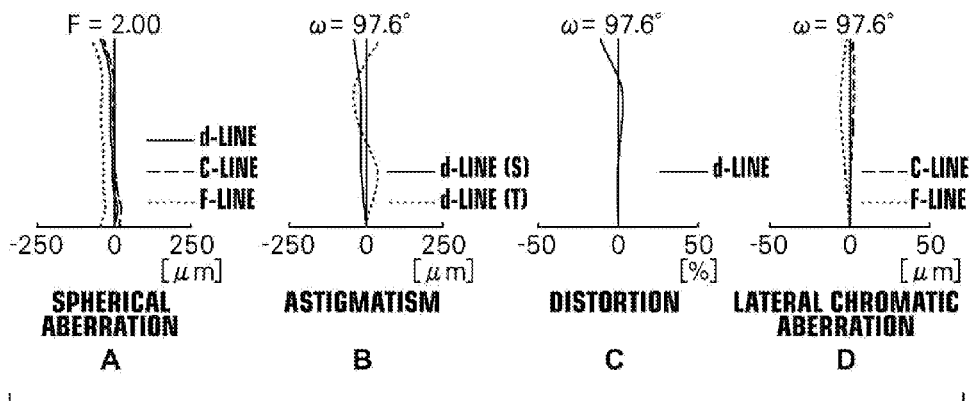
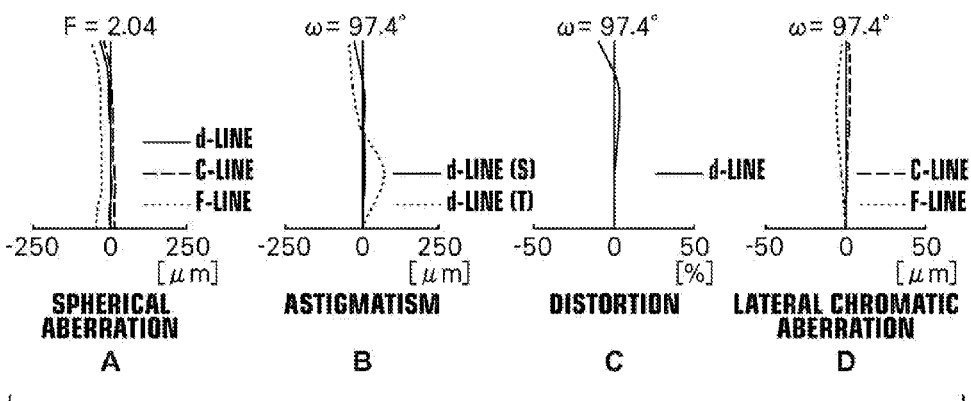

EXAMPLE 5

WIDE-ANGLE IMAGING LENS AND IMAGING APPARATUS

BACKGROUND OF THE INVENTION

1. Field of the Invention

The present invention relates to an imaging lens and an imaging apparatus, and more particularly to a wide-angle imaging lens appropriate for use with vehicle cameras, surveillance cameras, mobile terminal cameras, and the like that employ image sensors, such as CCDs (Charge Coupled Device), CMOSs (Complementary Metal Oxide Semiconductor), and the like, and an imaging apparatus equipped with the wide-angle imaging lens.

2. Description of the Related Art

Recently, downsizing and increasing in pixels of image sensors, such as CCDs, CMOSs, and the like, have been advancing. Along with this, downsizing of the bodies of imaging devices equipped with these image sensors has also been advancing. Consequently, a demand for downsizing, as well as improved performance, of imaging lenses to be mounted on the imaging devices has also been growing. In the mean time, imaging lenses used for vehicle cameras, surveillance cameras, and the like are demanded, along with the compactness, to be produced inexpensively with wide angles and high performance.

Japanese Patent No. 4625711 and Japanese Patent No. 5064154 propose a wide-angle imaging lens, as an imaging lens to be mounted on a vehicle camera, which is composed of a negative first lens, a negative second lens, a positive third lens, a negative fourth lens, and a positive fifth lens disposed in order from the object side in which the fourth and fifth lenses are cemented together.

SUMMARY OF THE INVENTION

In the mean time, the requirements of imaging lenses to be mounted on vehicle cameras, surveillance cameras, and the like are getting stricter year after year, and brighter imaging lenses with reduced size, increased angle, and improved performance are anticipated.

In view of the circumstances described above, it is an object of the present invention to provide a wide-angle imaging lens in which the brightness, reduced size, increased angle, and improved performance may be realized. It is a further object of the present invention to provide an imaging apparatus equipped with the wide-angle imaging lens.

A wide-angle imaging lens of the present invention is composed of a first lens having a negative meniscus shape with a convex surface on the object side, a negative second lens, a positive third lens, an aperture stop, a negative fourth lens, and a positive fifth lens disposed in order from the object side, wherein the fourth lens and the fifth lens are cemented with an interface which is convex on the object side and has an aspherical shape, and the imaging lens satisfies a conditional expression given below.

$$1.0 < R9/f \tag{1}$$

where:
R9: the radius of curvature of the interface
f: the focal length of the entire system The wide-angle imaging lens of the present invention is composed of five lenses but may include a lens substantially without any refractive power, an optical element other than a lens, such as a cover glass and the like, a lens flange, a lens barrel, an image sensor, a mechanical component, such as a camera shake correction mechanism, and the like, other than the five lenses.

In the present invention, the surface shapes of the lenses, such as convex, concave, plane, biconcave, meniscus, biconvex, plano-convex, plano-concave, and the like, and the signs, positive and negative, of the refractive powers of the lenses are considered within the paraxial region if an aspherical surface is involved unless otherwise specifically described. Further, the sign of the radius of curvature is positive if the surface shape is convex on the object side and negative if it is convex on the image side. The phrase "the center of the lens surface has a positive refractive power" as used herein refers to that the paraxial curvature of the lens has a value which makes the lens surface convex while the phrase "the center of the lens surface has a negative refractive power" as used herein refers to that the paraxial curvature of the lens has a value which makes the lens surface concave.

In the wide-angle imaging lens of the present invention, the third lens preferably has a biconvex shape.

Further, in the wide-angle imaging lens of the present invention, the fourth lens preferably has a meniscus shape.

Still further, in the wide-angle imaging lens of the present invention, the fifth lens preferably has a biconvex shape.

In the wide-angle imaging lens of the present invention, it is preferable that a normal to the object side surface of the second lens at a point on the surface where the outermost ray of the center light beam passes through the surface is parallel to the optical axis or intersects with the optical axis on the object side of the surface.

In the wide-angle imaging lens of the present invention, it is preferable that a normal to the object side surface of the third lens at a point on the surface where a lower ray of the outermost light beam passes through the surface and a normal to the surface at a point on the surface where an upper ray of the outermost light beam passes through the surface intersect with each other on the image side of the surface.

The wide-angle imaging lens of the present invention preferably satisfies conditional expressions (1-1) to (16-1) given below. The wide-angle imaging lens of the present invention may have a configuration of any one of the conditional expressions (1-1) to (16-1) given below or a configuration of a combination of any two or more of them.

$$1.0 < R9/f < 3.0 \tag{1-1}$$

$$1.0 < R9/f < 1.5 \tag{1-2}$$

$$-10 < f1/f < -4.0 \tag{2}$$

$$-10 < f1/f < -6.1 \tag{2-1}$$

$$-3.0 < f2/f < -1.5 \tag{3}$$

$$-2.4 < f2/f < -1.7 \tag{3-1}$$

$$2.5 < f3/f < 4.0 \tag{4}$$

$$3.05 < f3/f < 3.5 \tag{4-1}$$

$$-3.4 < f4/f < -2.0 \tag{5}$$

$$-3.0 < f4/f < -2.3 \tag{5-1}$$

$$1.5 < f5/f < 2.5 \tag{6}$$

$$1.7 < f5/f < 2.2 \tag{6-1}$$

$$0.0 < f123/f45 < 10.0 \tag{7}$$

$$0.0 < f123/f45 < 4.0 \quad (7\text{-}1)$$

$$0.5 < f123/f45 < 2.0 \quad (7\text{-}2)$$

$$\alpha > \beta \quad (8)$$

$$\theta < 20° \quad (9)$$

$$\theta < 10° \quad (9\text{-}1)$$

$$2.0 < R2/f \quad (10)$$

$$3.3 < R2/f \quad (10\text{-}1)$$

$$1.5 < D2/f < 2.5 \quad (11)$$

$$1.5 < D2/f < 2.1 \quad (11\text{-}1)$$

$$1.2 < D4/f < 2.8 \quad (12)$$

$$1.6 < D4/f < 2.3 \quad (12\text{-}1)$$

$$4.0 < SL/f \quad (13)$$

$$\gamma < 35° \quad (14)$$

$$1.69 < Nd1 \quad (15)$$

$$1.75 < Nd1 < 1.9 \quad (15\text{-}1)$$

$$vd1 < 56 \quad (16)$$

$$35 < vd1 < 53 \quad (16\text{-}1)$$

where:
f: the focal length of the entire system
f1: the focal length of the first lens
f2: the focal length of the second lens
f3: the focal length of the third lens
f4: the focal length of the fourth lens
f5: the focal length of the fifth lens
f123: the combined focal length of the first to the third lenses
f45: the combined focal length of the fourth and the fifth lenses
R2: the radius of curvature of the image side surface of the first lens
D2: the distance between the first lens and the second lens on the optical axis
D4: the distance between the second lens and the third lens on the optical axis
SL: the distance from the image plane to the aperture stop on the optical axis (the distance from the fifth lens to the image plane is air equivalent distance)
γ: the angle formed by the principal ray of the outermost light beam passing through the plane of the aperture stop with the optical axis
Nd1: the refractive index of the material of the first lens with respect to the d-line
vd1: the Abbe number of the material of the first lens with respect to the d-line Note that α is the absolute value of narrow side angle between a normal to the image side surface of the second lens at a point on the surface where an upper ray of the outermost light beam passes through the surface and a normal to the surface at a point on the surface where the principal ray of the outermost light beam passes through the surface, and the β is the absolute value of narrow side angle between the normal to the surface at the point on the surface where the principal ray of the outermost light beam passes through the surface and a normal to the surface at a point on the surface where a lower ray of the outermost light beam passes through the surface.

Further, θ is the absolute value of narrow side angle formed, if a point where a normal to the interface between the fourth and fifth lenses at a point on the interface where the principal ray of the outermost light beam passes through the interface intersects with the optical axis is taken as P1 and a point where a normal to the interface at a point on the interface where the upper ray of the outermost light beam passes through the interface intersects with the optical axis is taken as P2, by the two normals. Note that, in this case, the point P2 intersects with the optical axis on the image side of the point P1.

An imaging apparatus of the present invention is equipped with at least one of the wide-angle imaging lenses of the present invention described above.

According to the wide-angle imaging lens of the present invention, the entire system with a least number of lenses of five is arranged suitably in refractive power and the like to satisfy the conditional expression (1). This allows the surface shape of the interface of the cemented lens formed of the fourth and fifth lenses to be maintained appropriately and the imaging lens can be a bright lens having a high resolving power without generating high order aberrations. The refractive power distribution in a manner not to impair the freedom of the achromatizing effect of the cemented lens, in particular, allows a high resolving power to be obtained. Consequently, according to the present invention, downsizing, cost reduction, and increased angle may be achieved, and a wide-angle imaging lens having high optical performance that allows, even though it is bright, a favorable image to be obtained to the periphery of the imaging area may be realized since various aberrations are corrected satisfactorily.

According to the imaging apparatus of the present invention, the imaging apparatus is equipped with the wide-angle imaging lens of the present invention, so that the imaging apparatus may be constructed compact and inexpensively. Further, the imaging apparatus may perform imaging with a wide angle of view and obtain a high resolution good image.

BRIEF DESCRIPTION OF THE DRAWINGS

A to D of FIG. 10 are aberration diagrams of Example 1.
A to D of FIG. 11 are aberration diagrams of Example 2.
A to D of FIG. 12 are aberration diagrams of Example 3.
A to D of FIG. 13 are aberration diagrams of Example 4.
A to D of FIG. 14 are aberration diagrams of Example 5.

DESCRIPTION OF THE PREFERRED EMBODIMENTS

Hereinafter, embodiments of the present invention will be described in detail with reference to the accompanying drawings.

[Embodiments of Imaging Lens]

Figure 1:
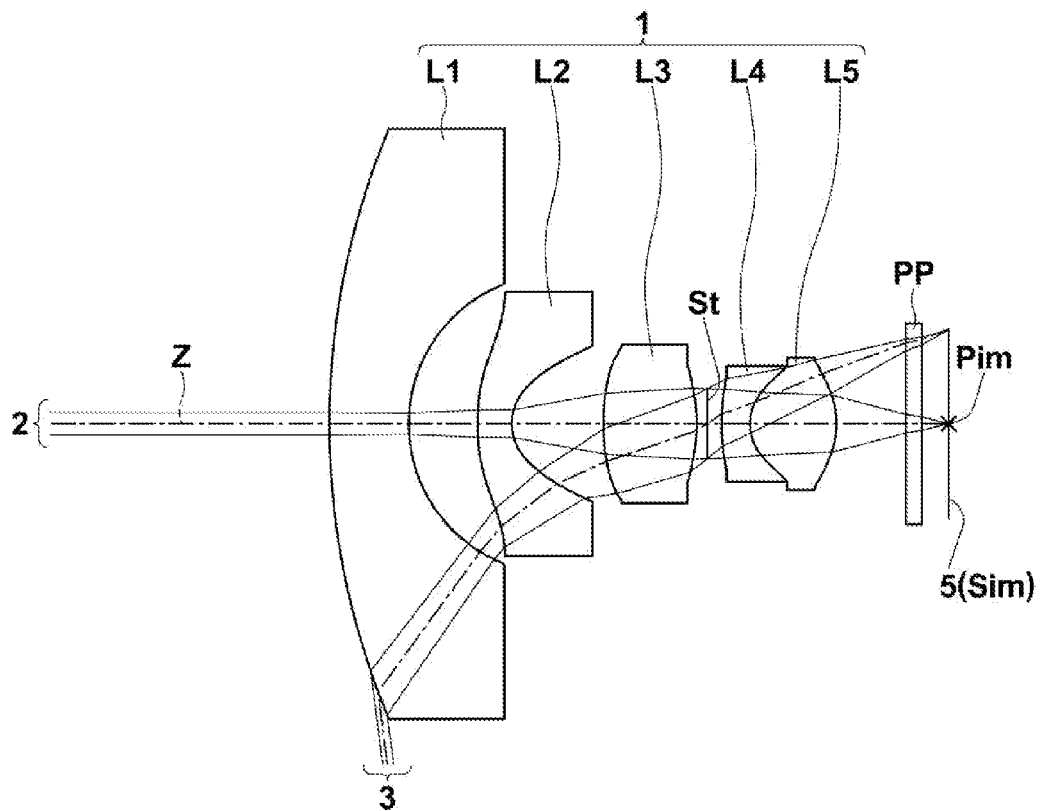
FIG. 1 is a cross-sectional view of an imaging lens of Example 1 of the present invention, illustrating a configuration thereof.
Figure 2:
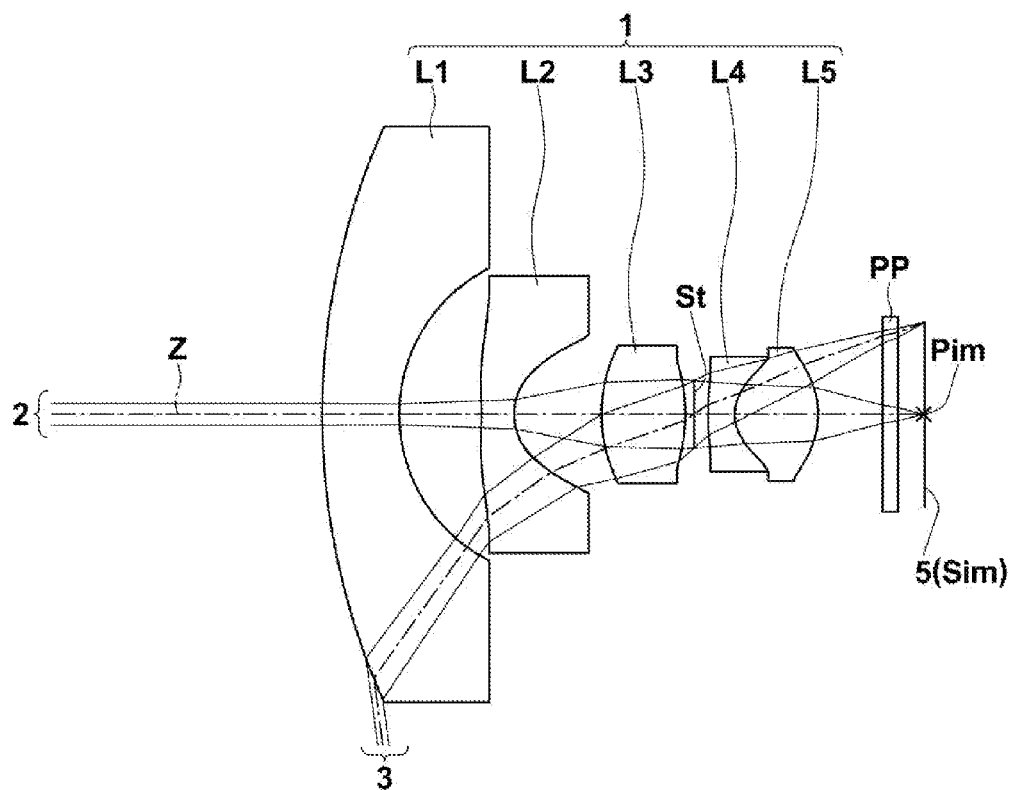
FIG. 2 is a cross-sectional view of an imaging lens of Example 2 of the present invention, illustrating a configuration thereof.
Figure 3:
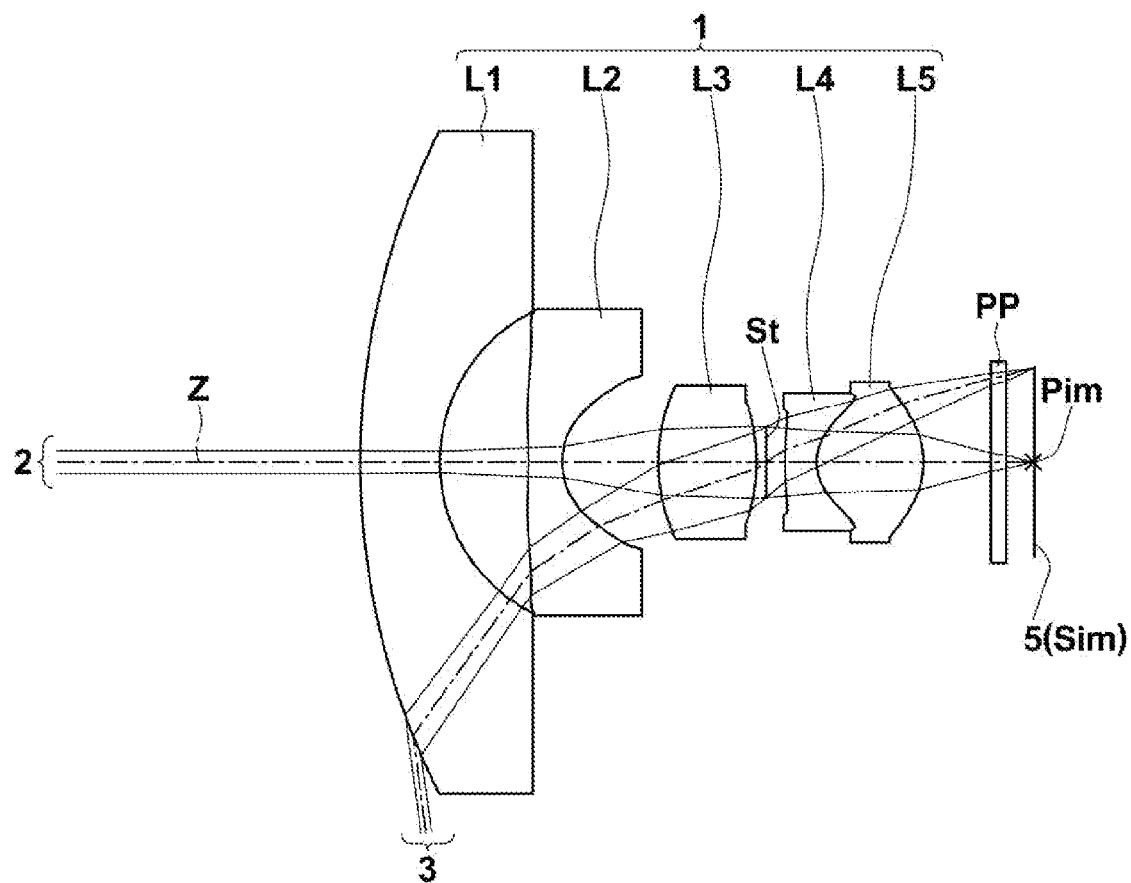
FIG. 3 is a cross-sectional view of an imaging lens of Example 3 of the present invention, illustrating a configuration thereof.
Figure 4:
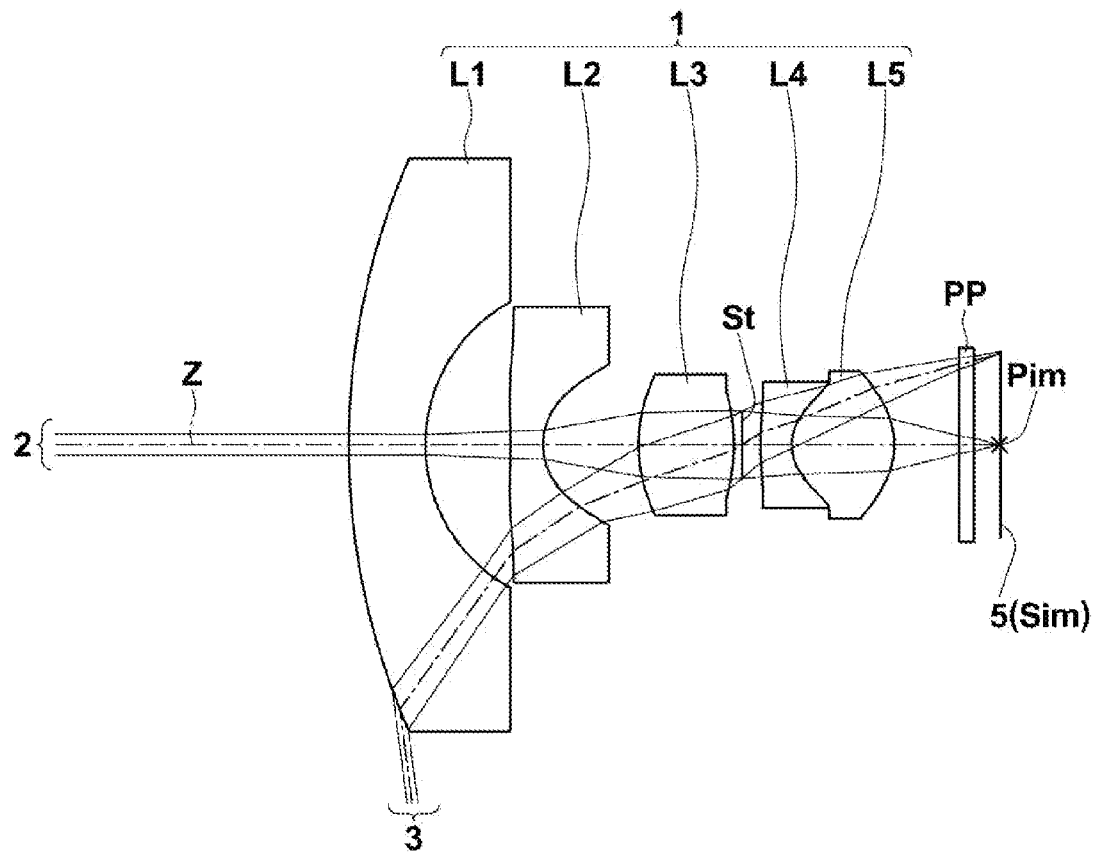
FIG. 4 is a cross-sectional view of an imaging lens of Example 4 of the present invention, illustrating a configuration thereof.
Figure 5:
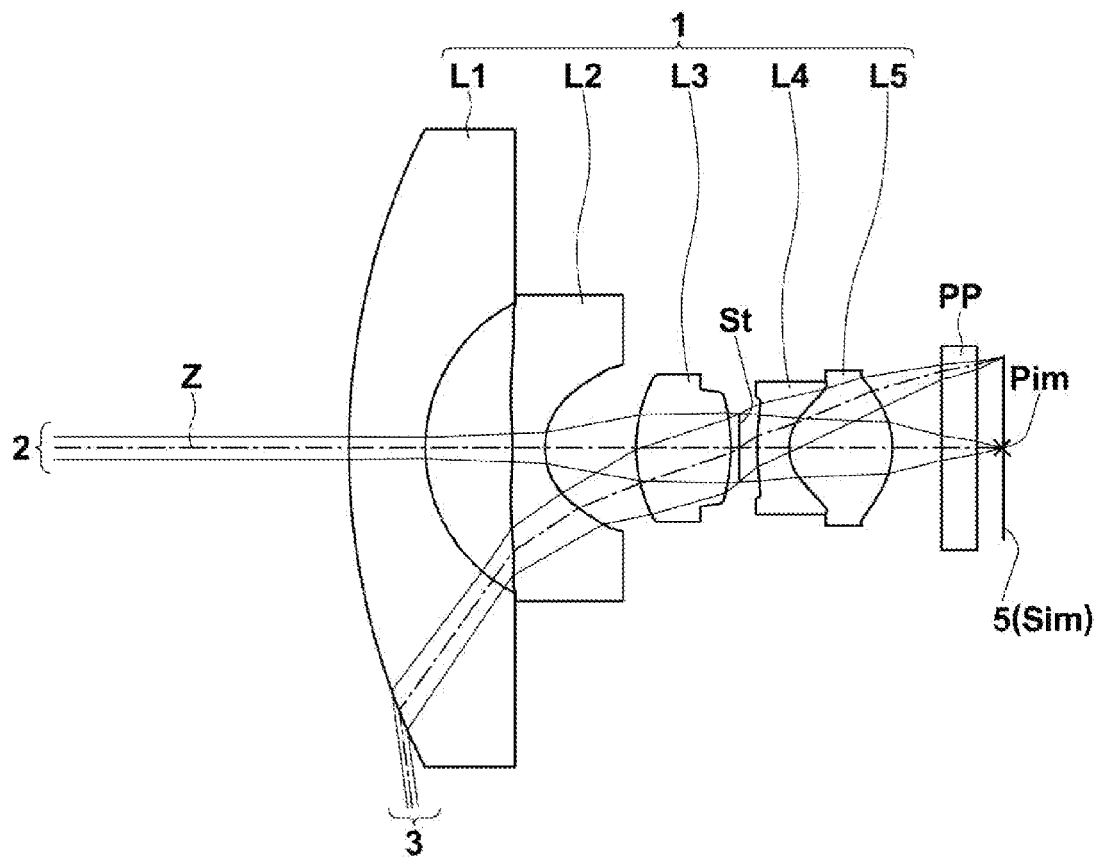
FIG. 5 is a cross-sectional view of an imaging lens of Example 5 of the present invention, illustrating a configuration thereof.

A wide-angle imaging lens according to an embodiment of the present invention will be described first with reference to FIG. 1. FIG. 1 illustrates the configuration of a wide-angle imaging lens 1 (hereinafter, simply "imaging lens") according to an embodiment of the present invention and optical paths thereof. Note that the imaging lens 1 shown in FIG. 1 corresponds to the imaging lens according to Example 1 of the present invention, to be described later. Likewise, the configurations and optical paths of imaging lenses according to Examples 2 to 5 are shown in FIGS. 2 to 5.

In FIGS. 1 to 5, the left side is the object side and the right side is the image side, and the center light beam (axial light beam) 2 from an object point at infinity and the outermost light beam (off-axis light beam) 3 at the total angle of view $2\omega$ are also illustrated. FIGS. 1 to 5 also illustrate an image sensor 5 disposed at the image plane Sim that includes the image point Pim of the imaging lens 1 in view of the case where the imaging lens 1 is applied to an imaging apparatus. The image sensor 5 converts an optical image formed by the imaging lens 1 to an electrical signal and, for example, a CCD image sensor, a CMOS image sensor, or the like may be used.

When the imaging lens is applied to an imaging apparatus, it is preferable that a cover glass, a low-pass filter, an infrared cut filter, and the like are provided according to the structure on the camera side on which the lens is mounted. Therefore, FIGS. 1 to 5 each illustrates an example in which a parallel plate optical member PP that assumes these is disposed between the most image side lens and the image sensor (image plane Sim).

The imaging lens according to an embodiment of the present invention is composed of a first lens L1 having a negative meniscus shape with a convex surface on the object side, a second lens L2 having a negative refractive power, a third lens L3 having a positive refractive power, a fourth lens L4 having a negative refractive power, and a fifth lens having a positive refractive power disposed in order from the object side. The fourth L4 and the fifth lens L5 are cemented to form a cemented lens with an interface which is convex on the object side. Note that the interface has an aspherical shape. In the examples shown in FIGS. 1 to 5, an aperture stop St is disposed between the third lens L3 and the fourth lens L4. The aperture stop St in FIGS. 1 to 5 does not represent the shape and size but rather indicates the position on the optical axis Z.

The imaging lens of the present embodiment is configured to satisfy a conditional expression (1) given below.

$$1.0 < R9/f \quad (1)$$

where:
R9: the radius of curvature of the interface between the fourth lens L4 and the fifth lens L5
f: the focal length of the entire system The imaging lens of the present embodiment is formed of a small number of lenses of five to achieve cost reduction and downsizing of the entire length in the optical axis direction. Further, the appropriate setting of the entire system in refractive power distribution and the like allows the imaging lens to be made bright with increased angle. The refractive power distribution of the fourth lens L4 and the fifth lens L5 in a manner not to impair the freedom of the achromatizing effect of the cemented lens allows high resolution performance to be obtained. Further, the aspherical shape of the interface allows high resolution performance to be obtained without generating high order aberrations thought the lens is bright.

Here, in the wide-angle lens, lateral chromatic aberration is generated which increases toward the periphery of the imaging area by the action of a strong negative power of the lens group on the object side of the aperture stop. By making the interface between the fourth lens L4 and the fifth lens L5 convex on the object side, the angle between each ray of the light beams at the periphery of the imaging area and a normal at a point where each ray passes may be increased, so that the lateral chromatic aberration may be corrected effectively by the use of the strong refractive power.

By Satisfying the lower limit of the conditional expression (1), the interface may be prevented from becoming a deep concave shape on the image side. When the imaging lens is made bright, this may inhibit the generation of high order aberrations in the light beams at the periphery of the imaging area and high resolution performance may be obtained.

Next, preferable arrangements of an imaging lens of an embodiment of the present invention will be given and the operational effects thereof will be described. The preferable aspects may include any one of the following or a combination of any two or more of them.

$$-10 < f1/f < -4.0 \quad (2)$$

$$-3.0 < f2/f < -1.5 \quad (3)$$

$$2.5 < f3/f < 4.0 \quad (4)$$

$$-3.4 < f4/f < -2.0 \quad (5)$$

$$1.5 < f5/f < 2.5 \quad (6)$$

$$0.0 < f123/f45 < 10.0 \quad (7)$$

$$\alpha > \beta \quad (8)$$

$$\theta < 20° \quad (9)$$

$$2.0 < R2/f \quad (10)$$

$$1.5 < D2/f < 2.5 \quad (11)$$

$$1.2 < D4/f < 2.8 \quad (12)$$

$$4.0 < SL/f \quad (13)$$

$$\gamma < 35° \quad (14)$$

$$1.69 < Nd1 \quad (15)$$

$$vd1 < 56 \quad (16)$$

where:
f: the focal length of the entire system
f1: the focal length of the first lens L1 f2: the focal length of the second lens L2
f3: the focal length of the third lens L3
f4: the focal length of the fourth lens L4
f5: the focal length of the fifth lens L5
f123: the combined focal length of the first L1 to the third lens L3
f45: the combined focal length of the fourth lens L4 and the fifth lens L5
R2: the radius of curvature of the image side surface of the first lens L1
D2: the distance between the first lens L1 and the second lens L2 on the optical axis
D4: the distance between the second lens and the third lens L3 on the optical axis
SL: the distance from the image plane to the aperture stop on the optical axis (the distance from the fifth lens L5 to the image plane is air equivalent distance)
γ: the angle formed by the principal ray of the outermost light beam passing through the plane of the aperture stop with the optical axis
Nd1: the refractive index of the material of the first lens with respect to the d-line
vd1: the Abbe number of the material of the first lens with respect to the d-line
α and β will be described later.

In order to enhance the effect of the conditional expression (1), the imaging lens more preferably satisfies a conditional expression (1-1) and further preferably satisfies a conditional expression (1-2).

$$1.0 < R9/f < 3.0 \quad (1\text{-}1)$$

$$1.0 < R9/f < 1.5 \quad (1\text{-}2)$$

By satisfying the upper limits of the conditional expressions (1-1) and (1-2), the refractive power of the interface may be secured and chromatic aberrations may be corrected satisfactorily, whereby high resolution performance may be obtained.

By satisfying the upper limit of the conditional expression (2), the negative refractive power is prevented from becoming too strong and the incident angle of a ray of the light beam at the periphery of the imaging area incident on the object side surface of the first lens L1 with respect to the surface normal is prevented from becoming too large, whereby the generation of high order aberrations may be inhibited. By satisfying the lower limit of the conditional expression (2), the negative refractive power may be ensured and the angle may be increased effectively. In order to enhance the effect of this, the imaging lens more preferably satisfies a conditional expression (2-1).

$$-10 < f1/f < -6.1 \quad (2\text{-}1)$$

By satisfying the upper limit of the conditional expression (3), the negative refractive power is prevented from becoming too strong and the incident angle of a ray of the light beam at the periphery of the imaging area incident on the object side surface of the second lens L2 with respect to the surface normal is prevented from becoming too large, whereby the generation of high order aberrations may be inhibited. By satisfying the lower limit of the conditional expression (3), the negative refractive power may be ensured and the diffusing power of rays is prevented from becoming too weak, whereby brightness and back focus may be obtained effectively. In order to enhance this effect, the imaging lens more preferably satisfies a conditional expression (3-1).

$$-2.4 < f2/f < -1.7 \quad (3\text{-}1)$$

By satisfying the upper limit of the conditional expression (4), the positive refractive power may be ensured and the distance between the third lens L3 and the aperture stop required for converging the rays diffused by the strong negative refractive power of the first lens L1 and the second lens L2 may be reduced, whereby it is easy to downsize the lens system. Further, this may reduce the burden of convergence effect on the fourth lens L4 and the fifth lens L5 and the interface is not required to have a strong refractive power, so that the freedom of design may be secured. By satisfying the lower limit of the conditional expression (4), the positive refractive power is prevented from becoming too strong and the angle formed by the incident ray with a normal to each surface of the object side surface and the image side surface of the third lens L3 is prevented from becoming too large, whereby the generation of high order aberrations may be inhibited and it becomes easy to obtain a bright lens. In order to enhance this effect, the imaging lens more preferably satisfies a conditional expression (4-1).

$$3.05 < f3/f < 3.5 \quad (4\text{-}1)$$

By satisfying the upper limit of the conditional expression (5), the negative refractive power is prevented from becoming too strong and the refractive power of the interface is prevented from becoming too strong, whereby the generation of high order aberrations in the light beam at the periphery of the imaging area may be inhibited and it becomes easy to obtain a bright lens. By satisfying the lower limit of the conditional expression (5), the negative refractive power is secured, whereby the achromatizing effect is prevented from reducing and high resolution performance may be obtained. In order to enhance this effect, the imaging lens more preferably satisfies a conditional expression (5-1).

$$-3.0 < f4/f < -2.3 \quad (5\text{-}1)$$

By satisfying the upper limit of the conditional expression (6), the positive refractive power is prevented from becoming too strong and the refractive power of the interface is prevented from becoming too strong, whereby the generation of high order aberrations in the light beam at the periphery of the imaging area may be inhibited and it becomes easy to obtain a bright lens. By satisfying the lower limit of the conditional expression (6), the positive refractive power is secured, whereby the achromatizing effect is prevented from reducing and high resolution performance may be obtained. In order to enhance this effect, the imaging lens more preferably satisfies a conditional expression (6-1).

$$1.7 < f5/f < 2.2 \quad (6\text{-}1)$$

By satisfying the conditional expression (7), the combined focal length of the first lens L1 to the third lens L3 becomes a positive appropriate value so that converging light may be sent to the fourth lens L4 and the fifth lens L5 and the convergence effect of the cemented lens may be reduced, whereby the freedom of achromatization is increased and a bright lens with high resolution performance may be realized. By satisfying the lower limit of the conditional expression (7), the combined focal length of the first lens L1 to the third lens L3 is prevented from becoming a negative value and diffused light is prevented from being sent to the fourth lens L4 and the fifth lens L5, thereby resulting in reduced convergence effect of the cemented lens, so that the freedom of achromatization may be increased. In order to enhance this effect, the imaging lens more preferably satisfies a conditional expression (7-1) and further preferably satisfies a conditional expression (7-2).

$$0.0 < f123/f45 < 4.0 \quad (7\text{-}1)$$

$$0.5 < f123/f45 < 2.0 \quad (7\text{-}2)$$

Figure 6:
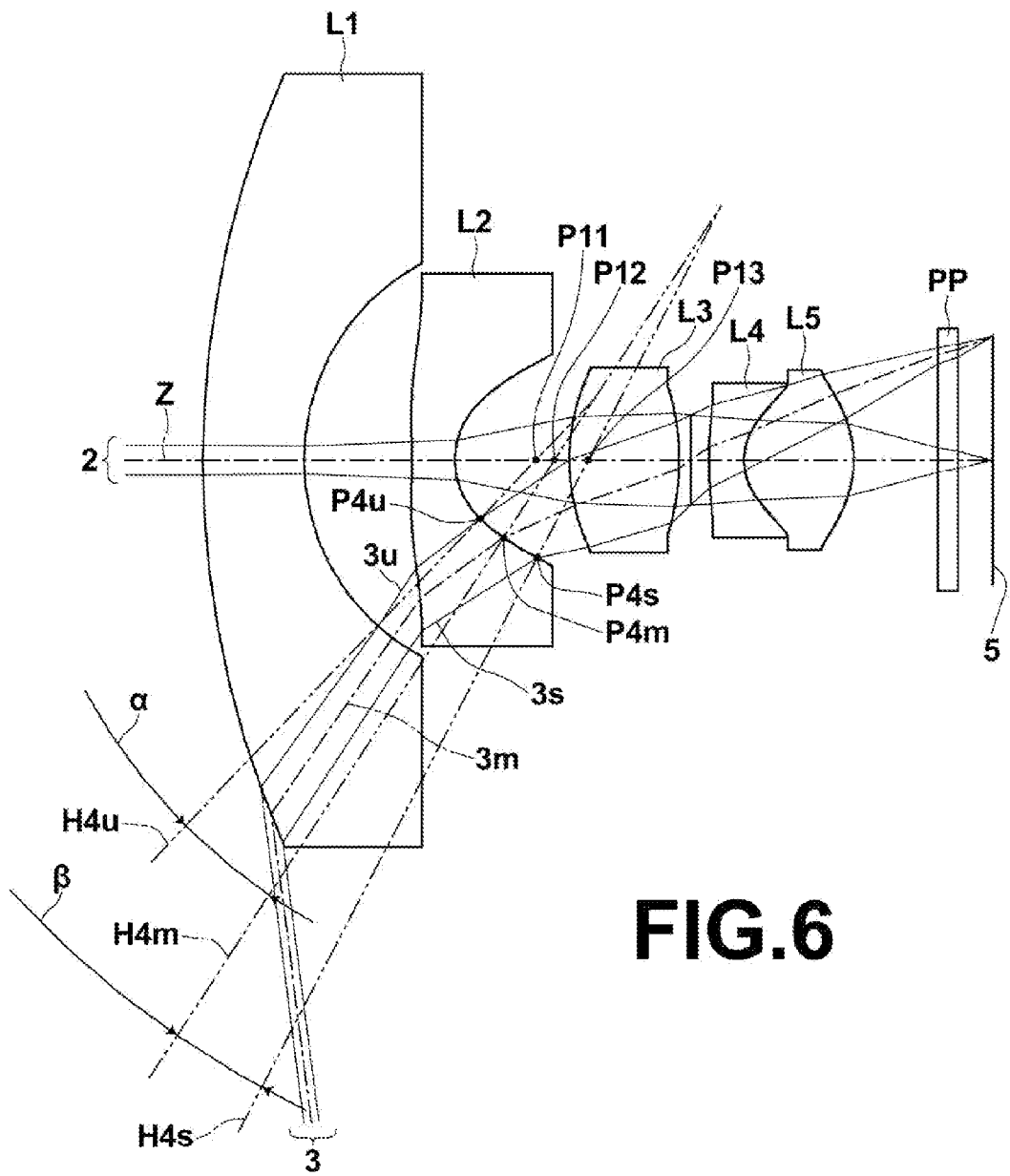
FIG. 6 is a drawing for explaining α and β.

In relation to the conditional expression (8), α and β will be described with reference to a drawing. FIG. 6 is a drawing for explaining α and β. Note that FIG. 6 and FIGS. 7 to 9, to be described later, represent the cross-sectional view of imaging lens of Example 3 shown in FIG. 3. As illustrated in FIG. 6, α is the angle between a normal H4u to the image side surface of the second lens L2 at a point P4u on the surface where an upper ray 3u of the outermost light beam 3 passes through the surface and a normal H4m to the surface at a point P4m on the surface where the principal ray 3m of the outermost light beam 3 passes through the surface. The β is the angle between the normal H4m and a normal H4s to the image side surface of the second lens L2 at a point P4s on the surface where a lower ray 3s of the outermost light beam 3 passes through the surface.

The phrase "lower ray 3s of the outermost light beam 3" as used herein refers to the ray closest to the optical axis of those included in the outermost light beam 3 between the most image side surface of the imaging lens 1 (the image side surface of the fifth lens L5 in this embodiment) and the image sensor 5. The phrase "upper ray 3u of the outermost light beam 3" as used herein refers to the ray most remote from the optical axis of those included in the outermost light beam 3 between the most image side surface of the imaging lens 1 and the image sensor 5.

In the imaging lens of the present embodiment, the normals H4u, H4m, and H4s intersect with the optical axis Z at the points P11, P12, and P13 respectively on the image side of the image side surface of the second lens L2. By satisfying the conditional expression (8), the image side surface of the second lens L2 is prevented from becoming a deep concave shape toward periphery. This may inhibit the generation of high order aberrations and allows the surface to be processed with high precision, whereby high performance is realized.

Figure 7:
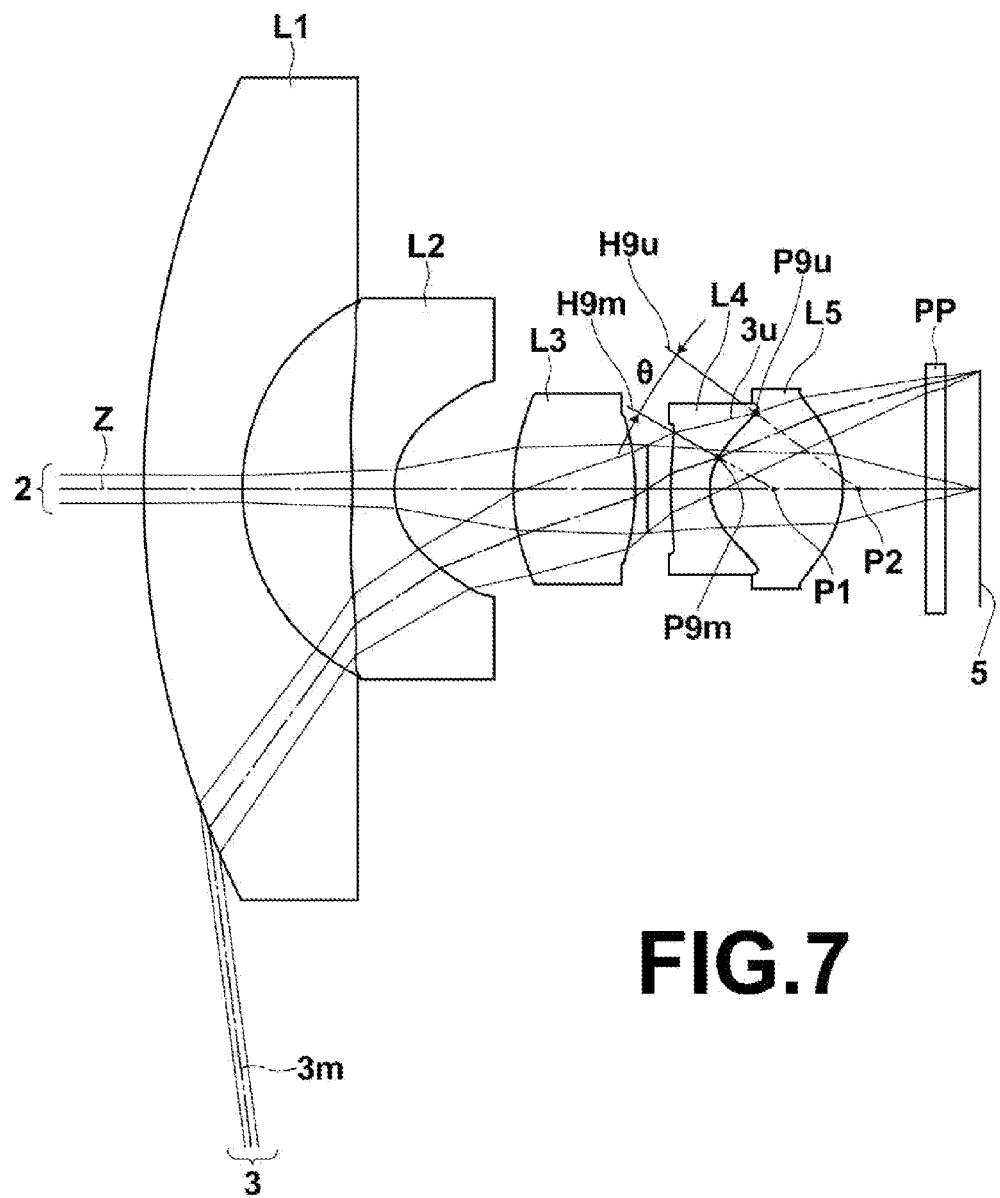
FIG. 7 is a drawing for explaining θ

In relation to the conditional expression (9), θ will be described with reference to a drawing. FIG. 7 is a drawing for explaining the θ. If a point where a normal H9m to the interface between the fourth lens L4 and the fifth lens L5 at a point on the interface where the principal ray 3m of the outermost light beam 3 passes through the interface intersects with the optical axis Z is taken as P1 and a point where a normal H9u to the interface at a point P9u on the interface where an upper ray 3u of the outermost light beam 3 passes through the interface intersects with the optical axis Z is taken as P2. The θ is the absolute value of narrow side angle between the two normals H9m and H9u.

Note that, in the imaging lens of the present embodiment, the point P2 intersects with the optical axis on the image side of the point P1. By satisfying the conditional expression (9), angles between the surface normals and incident rays may be maintained within a certain range at the periphery of the interface between the fourth lens L4 and the fifth lens L5. This may inhibit the generation of high order aberrations at the periphery even when the interface has a strong refractive power for achromatization, whereby high resolution performance may be obtained effectively. In order to enhance this effect, the imaging lens more preferably satisfies a conditional expression (9-1).

$$\theta<10° \tag{9-1}$$

A smaller radius of curvature of the image side surface of the first lens L1 is more advantageous for increasing the angle, but by satisfying the lower limit of the conditional expression (10), the radius of curvature is prevented from becoming too small, whereby the strong diffusing action in the light beam at the periphery of the imaging area may be inhibited and the generation of high order aberrations may be prevented. In order to enhance this effect, the imaging lens more preferably satisfies a conditional expression (10-1).

$$3.3<R2/f \tag{10-1}$$

By satisfying the upper limit of the conditional expression (11), the radius of curvature on the image side of the first lens L1 is prevented from becoming too small and aberrations may be corrected easily. By satisfying the lower limit of the conditional expression (11), the radius of curvature is prevented from becoming too large and the angle may be increased easily. In order to enhance this effect, the imaging lens more preferably satisfies a conditional expression (11-1).

$$1.5<D2/f<2.1 \tag{11-1}$$

By satisfying the upper limit of the conditional expression (12), the light beam diffused by the first lens L1 and the second lens L2 is prevented from spreading widely and the converging effect of the lens group following the second lens L2 is not required to be increased. This allows aberrations to be corrected easily. By satisfying the lower limit of the conditional expression (12), the light beam is diffused sufficiently before being incident on the third lens L3 having a positive refractive power, thereby allowing a bright lens system to be realized easily. In order to enhance this effect, the imaging lens more preferably satisfies a conditional expression (12-1).

$$1.6<D4/f<2.3 \tag{12-1}$$

By satisfying the lower limit of the conditional expression (13), the exit pupil may be kept away from the image plane and the incident angle on the image plane may be reduced, which is particularly advantageous if the image sensor 5 has a small incident angle characteristic.

By satisfying the lower limit of the conditional expression (14), an incident angle of ray on the image plane may be maintained appropriately small and the angle between the principal ray and the surface normal at a point on each surface of the lenses on the image side of the aperture stop is not required to be increased, whereby the generation of high order aberrations may be inhibited and high resolution performance may be obtained effectively.

By satisfying the lower limit of the conditional expression (15), the first lens L1 may have an appropriate refractive power, so that the radius of curvature of the image side surface of the first lens L1 is prevented from becoming too small and aberrations may be corrected easily. In order to enhance this effect, the imaging lens more preferably satisfies a conditional expression (15-1).

$$1.75<Nd1<1.9 \tag{15-1}$$

If the imaging lens exceeds the upper limit of the conditional expression (15-1), the material with an appropriate Abbe number, in particular, for correcting longitudinal chromatic aberration does not exist any more.

If the imaging lens exceeds the upper limit of the conditional expression (16), the material having an appropriate refractive power does not exist any more. The imaging lens more preferably satisfies a conditional expression (16-1)

$$35<vd1<53 \tag{16-1}$$

By satisfying the lower limit of the conditional expression (16-1), the longitudinal chromatic aberration may be inhibited and the resolution may be improved easily.

The third lens L3 preferably has a biconvex shape. In the third lens L3, the light beams diffused by two lenses having strong negative powers, the first lens L1 and the second lens L2 located on the object side thereof, need to be gradually converged. To that end, it is necessary to prevent the generation of high order aberrations by maintaining the angle between each ray and a surface normal at a point where each ray passes through the third lens L3 at an appropriate value. For a lens having a positive refractive power with a concave shape on the object side, the radius of curvature of the object side surface needs to be reduced in order to cause the rays to converge. But, if the radius of curvature of the object side surface is reduced, high order aberrations are likely to be generated, in particular, in the light beam at the periphery of the imaging area. In the mean time, for a lens having a positive refractive power with a concave shape on the image side, the diffusing effect of the image side surface becomes strong unless a strong converging effect is given to the object side surface, it is difficult to correct aberrations without generating high order aberrations by causing the light beam to gradually converge. By forming the third lens L3 in a biconvex shape, the generation of high order aberrations in the periphery of the imaging area may be inhibited and aberrations may be corrected easily.

The fourth lens L4 preferably has a meniscus shape. By forming the fourth lens L4 in a meniscus shape, rays of the light beam at the periphery of the imaging area are prevented from being subjected to a strong diffusing effect and converging effect of the interface and the image side surface of the fifth lens L5 may be reduced, whereby the generation of high order aberrations may be inhibited even though the imaging lens is made as a bright lens.

The fifth lens preferably has a biconvex shape. The object side surface of the fifth lens L5 preferably has a convex shape on the object side, in particular, for correcting lateral chromatic aberration while the image side surface of the fifth lens L5 preferably has a convex shape on the image side for correcting various types of aberrations. If the image side surface of the fifth lens L5 has a concave shape, a diffusing effect is generated by the surface and rays of the center light beam incident on the image side surface are required to be made into a relatively strongly converged light or the radius of curvature of the image side surface needs to be reduced. But such measures are undesirable, because if the rays of the center light beam are made into a relatively strong converged light, high order aberrations are likely to occur in spherical aberration and if the radius of curvature of the image side surface is reduced, high order aberrations are likely to occur in off-axis coma aberration.

Figure 8:
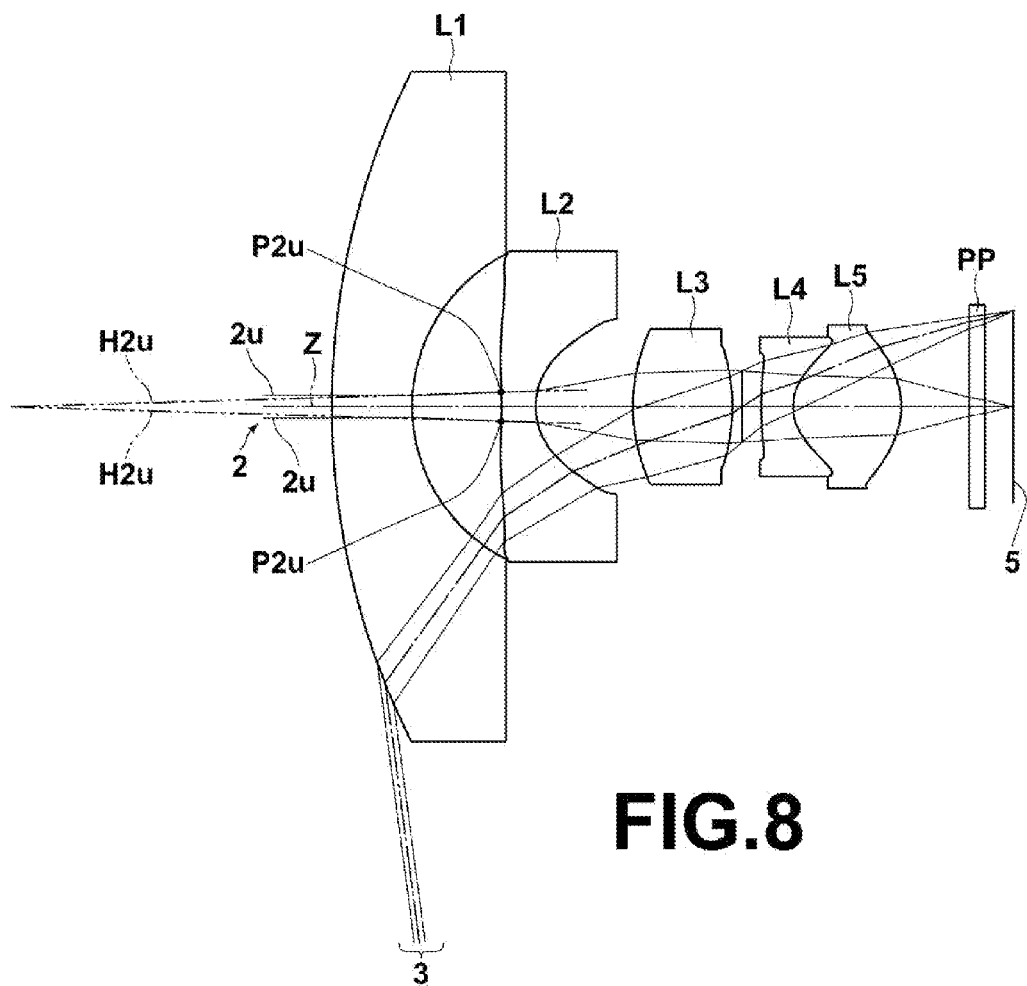
FIG. 8 is a drawing for explaining that a normal to the object side surface of the second lens at a point on the surface where the outermost ray of the center light beam passes through the surface is parallel to the optical axis or intersects with the optical axis on the object side of the surface.

Preferably, a normal to the object side surface of the second lens L2 at a point on the surface where the outermost ray of the center light beam passes through the surface is parallel to the optical axis or intersects with the optical axis on the object side of the surface. FIG. 8 is a drawing for explaining that a normal to the object side surface of the second lens L2 at a point on the surface where the outermost ray of the center beam passes through the surface is parallel to the optical axis or intersects with the optical axis on the object side of the surface. As illustrated in FIG. 8, a normal H2u to the object side surface of the second lens L2 at a point P2u on the surface where the outermost ray 2u of the center light beam 2 passes through the surface intersects with the optical axis on the object side of the surface in the present embodiment.

This will result in that the object side surface of the second lens L2 does not have a convex shape near the optical axis Z and the second lens L2 may have a strong negative refractive power near the optical axis. This is advantageous for the realization of a bright lens and a lens having a long back focus.

Figure 9:
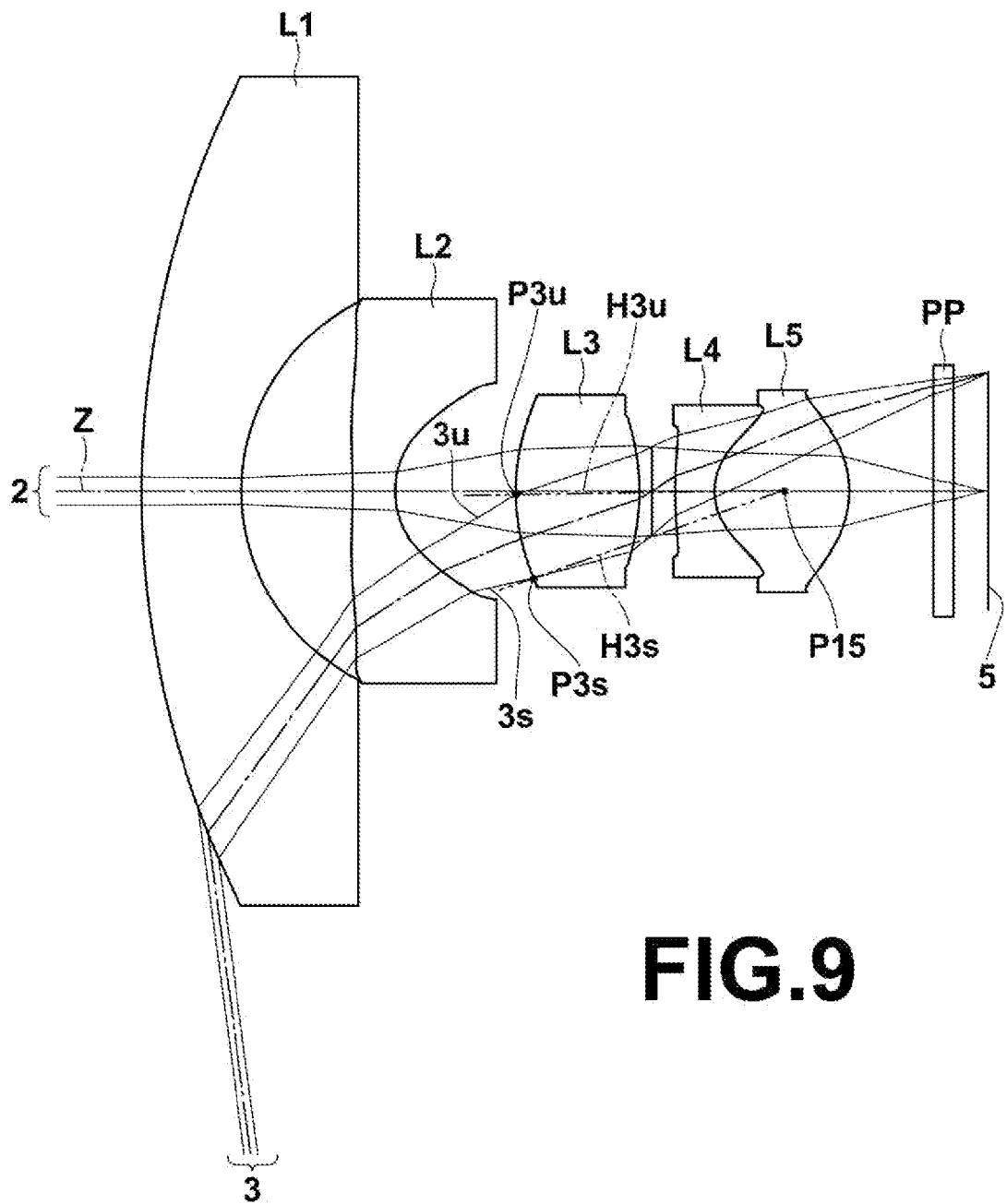
FIG. 9 is a drawing for explaining that a normal to the object side surface of the third lens at a point on the surface where a lower ray of the outermost light beam passes through the surface and a normal to the surface at a point on the surface where an upper ray of the outermost light beam passes through the surface intersect with each other on the image side of the surface.

Preferably, a normal to the object side surface of the third lens L3 at a point on the surface where a lower ray of the outermost light beam passes through the surface and a normal to the object side surface of the third lens L3 at a point on the surface where an upper ray of the outermost light beam passes through the surface intersect with each other on the image side of the object side surface of the third lens L3. FIG. 9 is a drawing for explaining that a normal to the object side surface of the third lens L3 at a point on the surface where a lower ray of the outermost light beam passes through the surface and a normal to the object side surface of the third lens L3 at a point on the surface where an upper ray of the outermost light beam passes through the surface intersect with each other on the image side of the surface. As illustrated in FIG. 9, a normal H3s to the object side surface of the third lens L3 at a point P3s on the surface where a lower ray 3s of the outermost light beam 3 passes through the surface and a normal H3u to the object side surface of the third lens L3 at a point P3u on the surface where an upper ray 3u of the outermost light beam 3 passes through the surface intersect with each other at a point P15 on the image side of the object side surface of the third lens L3.

This allows the angles between surface normals and incident rays on the object side surface of the third lens to be maintained within a certain range without changing largely, so that the generation of high order aberrations, in particular, in the outer rays (lower side rays) of the light beams at the periphery of the imaging area may be inhibited and the burden of aberration correction on the lenses located on the image side of the third lens L3 may be reduced.

The aperture stop is a stop for determining the F-number (Fno) of a lens system. The aperture stop St is preferably disposed between the object side surface of the third lens L3 and the image side surface of the fourth lens L4, and this allows the entire system to be downsized easily. The aperture stop St is more preferably disposed between the image side surface of the third lens L3 and the object side surface of the fourth lens L4, and this allows the entire system to be downsized easily.

Preferably, either surface of each lens of the first lens L1 to the fifth lens L5 is an aspherical surface. This allows various types of aberrations to be corrected satisfactorily.

Preferably, at least one surface of each of the second lens L2 to the fifth lens L5 is an aspherical surface. The use of the aspherical surface allows the spherical aberration to be corrected satisfactorily, and the degree of freedom to correct field curvature, distortion, and the like in the off-axis area is increased, whereby satisfactory aberration corrections may be made and good resolution performance may be obtained. In order to obtain higher resolution performance, both surfaces of each of the second lens L2 to the fifth lens L5 are preferably aspherical.

Preferably, the material of the first lens L1 is glass. In the case where the imaging lens is used in harsh environment such as, for example, in vehicle cameras, surveillance cameras, and the like, the first lens L1 disposed on the most object side is required to be made of a material which is tolerant to surface degradation by the weather and temperature change by direct sunlight, and resistant to chemicals, such as grease, detergent, and the like, that is, a material having high water resistance, weather resistance, acid resistance, chemical resistance, and the like. Further, the use of a hard and less breakable material is sometimes required. The use of glass may satisfy these requirements. Further, a transparent ceramics may be used as the material of the first lens L1.

Note that a protection means for increasing the strength, scratch resistance, and chemical resistance may be provided on the object side surface of the first lens L1. In this case, a plastic may be used as the material of the first lens L1. Such protection means may be a hard coating or a water repellent coating. The use of the plastic as the material of the first lens L1 allows, when at least one surface thereof is made aspherical, the aspherical shape to be reproduced accurately and a good performance lens may be produced. Further, this allows a light weight and inexpensive lens system to be produced. Still further, as the light beams are separated from the center toward the periphery in the first lens L1, the use of an aspherical surface on at least one side of the first lens L1 allows the distortion and field curvature to be corrected more satisfactorily, whereby good resolution performance may be obtained.

In order to produce an optical system with high environmental resistance, all lenses are preferably made of glass. In the case where the imaging lens is used as a surveillance camera lens or as a vehicle camera lens, the lens is likely to be used in various conditions, such as in a wide temperature range from high to low temperatures, high humidity, and the like. In order to produce an optical system resistant to these conditions, all lenses are preferably made of glass.

Depending on the application of the imaging lens 1, a filter that will cut ultraviolet light to blue right or an IR (Infrared) cut filter that will cut infrared light may be inserted between the lens system and image sensor 5. A coating having an identical characteristic to that of the filter described above may be applied to a lens surface. Otherwise, a material that will absorb ultraviolet light, blue light, infrared light, or the like may be used as the material of any lens.

FIG. 1 illustrates an example in which the optical member PP assuming various types of filters and the like is disposed between the lens system and image sensor 5. Instead of this, the various types of filters may be disposed between each lens. Otherwise, a coating having an identical effect to that of the various types of filters may be applied to a lens surface of any lens included in the imaging lens.

As a light beam passing through the outside the effective diameter between each lens may possibly reach the image plane as stray light and becomes a ghost, it is preferable that a light blocking means for blocking the stray light is provided, as required. As for the light blocking means, for example, an opaque paint may be applied to a lens portion outside the effective diameter or an opaque plate may be provided thereon. Alternatively, an opaque plate may be provided in the optical path of a stray light beam, as the light blocking means. Otherwise, a hood or the like that will block stray light may be disposed on the object side of the most object side lens.

In addition, a member, such as a stop, that will block peripheral rays to the extent that does not cause any practical problem in relative illumination may be disposed between each lens. The term "peripheral rays" as used herein refers to rays of those from an object point off the optical axis Z that pass through a peripheral portion of the entrance pupil of an optical system. Disposition of the member that will block the peripheral rays in the manner described above allows the image quality at the periphery of the imaging area to be improved. Further, by blocking the light that generates ghosts by this member, ghosts may be reduced.

Preferably, the lens system is composed of only five lenses of the first lens L1, the second lens L2, the third lens L3, the fourth lens L4, and the fifth lens L5. By composing the lens system with only five lenses, it is possible to make the lens system inexpensive.

The imaging apparatus according to the present embodiment is equipped with the imaging lens according to the present embodiment, so that the apparatus may be constructed compact and inexpensively, has a sufficiently wide angle of view, and may obtain a high resolution good image with the use of an image sensor.

Note that images captured by the imaging apparatus equipped with the imaging lens according to the present embodiment may be displayed on a cell phone. For example, there may be a case in which imaging apparatuses equipped with the imaging lenses according to the present embodiment are mounted on an automobile as vehicle cameras to image the rear side and around the automobile, and the images obtained by the imaging are displayed on a display device. In such a case, for an automobile having a car navigation system (hereinafter "car navigation"), the captured images may be displayed on the display unit of the car navigation. For an automobile without car navigation, it is necessary to install a dedicated display device, such as a liquid crystal display or the like, in the automobile. The display device is expensive, however. In the mean time, recent cell phones include high performance display units that allow browsing of motion pictures and Webs. The use of a cell phone as the display device for the vehicle cameras may eliminate the need to install a dedicated display device for an automobile without car navigation and, as a result, it is possible to mount vehicle cameras inexpensively.

Here, the images captured by the vehicle cameras may be transmitted to the cell phone via a wire transmission using a cable or the like, or via a wireless transmission, such as an infrared communication or the like. Further, the cell phone or the like may be associated with the operation state of the automobile and an image of a vehicle camera may be displayed automatically on the display unit of the cell phone when the gear of the automobile is shifted to the rear position or a turn signal or the like is given.

As for the display device for displaying images of vehicle cameras, a portable information terminal, such as PDA or the like, a small personal computer, or portable small car navigation may be used, as well as the cell phone.

Further, a cell phone equipped with the imaging lens of the present invention may be used as a vehicle camera by fixing it on an automobile. As recent smartphones have a processing power comparable to that of personal computers, the camera of a cell phone may be used in the same manner as a vehicle camera by, for example, fixing the cell phone to the dashboard of the automobile and directing the camera to the front side. Note that the function to recognize white lines and traffic signs and to issue a warning may be provided, as an application of smartphones. Further, the cell phone equipped with the imaging lens of the present invention may be used as a system for issuing a warning when a driver is drowsy or inattentive by directing the camera to the driver. Further, it may be associated with an automobile and serves as a part of a system for operating the steering wheel. As automobiles are left in hot or cold environments, severe environmental resistance is required for the vehicle camera. In the case where the imaging lens of the present invention is installed in a cell phone, the cell phone will get out of the automobile with the driver other than while driving, so that the environmental resistance may be relaxed and the vehicle system may be introduced inexpensively.

[Numerical Examples of Imaging Lens]

Numerical examples of the imaging lens of the present invention will now be described. Tables 1, 2, and 3, to be described later, show specific lens data corresponding to the configuration of the imaging lens 1 of the Example 1 illustrated in FIG. 1. Table 1 shows basic lens data of the imaging lens 1, Table 2 shows spec data, and Table 3 shows aspherical surface data. The surface number Si section in the lens data shown in Table 1 indicates $i^{th}$ surface number in which a number i is given to each surface of each lens element in a serially increasing manner toward the image side with the object side surface of the most object side lens element being taken as the first surface. The radius of curvature Ri section indicates the value of radius of curvature of $i^{th}$ surface from the object side (mm). Likewise, the surface distance Di section indicates the surface distance (mm) on the optical axis between $i^{th}$ surface, Si, and $(i+1)^{th}$ surface, Si+1, from the object side. The Ndj section indicates the refractive index of $j^{th}$ optical element from the object side with respect to the d-line (587.56 nm). The vdj section indicates the Abbe number of $j^{th}$ optical element from the object side with respect to the d-line. The lens data includes the aperture stop St and "∞" is indicated in the radius of curvature field of the surface corresponding to the aperture stop St.

In the imaging lens according to Example 1, both surfaces of the second lens L2 to the fifth lens L5 are all aspherical. In the basic lens data of Table 1, values of radii of curvature near the optical axis (paraxial radii of curvature) are indicated as the radii of curvature of these aspherical surfaces.

Table 2 shows spec data of the imaging lens of Example 1. As the spec data, the focal length f (mm) of the entire system, back focus Bf (mm), F-number (Fno.), and angle of view 2ω[°] are shown. The value of the back focus Bf represents the air equivalent value.

Table 3 shows aspherical surface data of the imaging lens of Example 1. In the values indicated as aspherical surface data, the symbol "E" indicates that the numerical value that follows is the "exponent" to base 10 and the value preceding "E" is multiplied by the value represented by the exponent function to base 10. For example, "1.0E-02" represents "1.0× $10^{-2}$".

As for the aspherical surface data, values of each coefficient Ai and KA in an aspherical surface expression represented by a formula (A) given below. More specifically, Z is the length (mm) of the vertical line from a point on the aspherical surface at a height h from the optical axis to the tangent plane at the vertex of the aspherical surface (flat surface orthogonal to the optical axis)

$$Z = C \cdot h^2 / \{1 + (1 - KA \cdot C^2 \cdot h^2)^{1/2}\} + \Sigma Ai \cdot h^i \quad (A)$$

where:
Z: the depth of the aspherical surface (mm)
h: distance from the optical axis to the lens surface (height) (mm)
C: paraxial curvature=1/R (R: paraxial radius of curvature)
Ai: $i^{th}$ order (i: integer of three or more) spherical surface coefficient
KA: aspherical surface coefficient As in the imaging lens of Example 1 described above, specific lens data corresponding to the configurations of Examples 2 to 5 illustrated in FIGS. 2 to 5 are shown in Tables 4 to 15. In the imaging lenses according to Examples 1 to 5, both surfaces of the second lens L2 to fifth lens L5 are all aspherical.

As the unit of length, "mm" is used, but this is only an example and other appropriate units may also be used because optical systems are usable even when they are proportionally enlarged or reduced.

Table 16 summarizes the values of conditional expressions (1) to (16) according to the present invention for Examples 1 to 5. Table 16 further shows the position of point P1 where a normal H9s to the interface between the forth lens L4 and the fifth lens L5 at a point P9m on the interface where the principal ray 3m of the outermost light beam 3 passes through the interface intersects with the optical axis and the position of point P2 where a normal H9u to the interface at a point P9u on the interface where the upper ray 3u of the outermost light beam 3 passes through the interface intersects with the optical axis. The positions of points P1 and P2 are distances on the optical axis from the surface vertex of the object side surface of the fifth lens L5 (interface) to the points P1 and P2 on the image side.

TABLE 1

Example 1•Lens Data

| Si | Ri | Di | Ndj | vdj |
|---|---|---|---|---|
| 1 | 14.36967 | 1.4990 | 1.77250 | 49.60 |
| 2 | 2.84516 | 1.3010 | | |
| *3 | 6.34943 | 0.6450 | 1.53391 | 55.89 |
| *4 | 0.86764 | 1.7410 | | |
| *5 | 4.93030 | 1.7640 | 1.63366 | 23.81 |
| *6 | −2.65066 | 0.1950 | | |
| 7(Aperture) | ∞ | 0.2730 | | |
| *8 | 5.77736 | 0.5390 | 1.63366 | 23.81 |
| *9 | 1.11150 | 1.6300 | 1.53391 | 55.89 |
| *10 | −1.50080 | 1.3117 | | |
| 11 | ∞ | 0.3000 | 1.51680 | 64.20 |
| 12 | ∞ | 0.5120 | | |

*Aspherical Surface

TABLE 2

Example 1•Specs

| f | 0.768 |
|---|---|
| Bf | 0.512 |
| Fno. | 2.01 |
| 2ω[°] | 194.6 |

TABLE 3

Example 1•Aspherical Surface Data

| Si | KA | A3 | A4 | A5 | A6 |
|---|---|---|---|---|---|
| 3 | 0.0000000E+00 | 1.1133239E−01 | −1.9252340E−01 | 2.0642467E−01 | 7.6981207E−02 |
| 4 | 0.0000000E+00 | −4.7955572E−01 | 1.8185350E+00 | −1.3976476E−01 | −8.9435835E+00 |
| 5 | 0.0000000E+00 | 3.7230898E−02 | −1.3358061E−01 | 1.4986955E−01 | 4.0319225E−01 |
| 6 | 0.0000000E+00 | −6.0192843E−02 | 2.3543398E−01 | 4.1194537E−01 | −1.5415033E+00 |
| 8 | 0.0000000E+00 | −6.8994385E−03 | 2.1456455E−01 | −1.0539680E+00 | 1.6016356E+00 |
| 9 | 0.0000000E+00 | 3.0238434E−01 | −8.7060280E−01 | 3.6311181E−01 | 1.4951563E+01 |
| 10 | 0.0000000E+00 | 1.8738006E−01 | −6.9579789E−01 | 4.0118670E−01 | 4.6697714E+00 |

| | A7 | A8 | A9 | A10 | A11 |
|---|---|---|---|---|---|
| 3 | −2.3595131E−01 | −8.0307180E−03 | 1.5297031E−01 | −2.2123073E−02 | −5.6390468E−02 |
| 4 | 1.2347456E+01 | 1.1448004E+01 | −3.1648347E+01 | −2.1030359E+00 | 3.9329336E+01 |
| 5 | −7.4777341E+01 | −8.9656000E−01 | 2.4257764E+00 | 5.4055287E−01 | −4.0231623E+00 |
| 6 | −2.2747227E+00 | 9.3899253E+00 | 3.9693746E+00 | −2.7506591E+01 | −2.6824127E+00 |
| 8 | 1.4198036E+01 | −4.2840602E+01 | −5.0050290E+01 | 2.8358264E+02 | −6.1842225E+01 |
| 9 | −3.1667615E+01 | −3.8311614E+01 | 1.5984360E+02 | −1.7101043E+01 | −3.5619365E+02 |
| 10 | −9.3656610E+00 | −9.7339793E+00 | 3.6878004E+01 | 2.9908827E+00 | −7.1682090E+01 |

TABLE 3-continued

Example 1·Aspherical Surface Data

| | A12 | A13 | A14 | A15 | A16 |
|---|---|---|---|---|---|
| 3 | 1.3663057E−02 | 1.2231006E−02 | −3.7027998E−03 | −1.5317624E−03 | 5.2378560E−04 |
| 4 | −9.9224058E+00 | −2.7615100E+01 | 1.1514445E+01 | 1.1195828E+01 | −5.7842627E+00 |
| 5 | 1.0847869E+00 | 3.3278282E+00 | −1.7796933E+00 | −1.7158127E+00 | 1.6135725E+00 |
| 6 | 4.6403409E+01 | 1.8604539E+00 | −4.8052319E+01 | −8.6067673E+00 | 3.5078398E+01 |
| 8 | −7.8219479E+02 | 6.6178925E+02 | 9.0851711E+02 | −1.2834142E+03 | −2.3540901E+02 |
| 9 | 2.4959638E+02 | 3.6665580E+02 | −4.4894650E+02 | −1.1577502E+02 | 3.3382956E+02 |
| 10 | 2.1547035E+01 | 7.7249941E+01 | −3.7884641E+01 | −4.8785270E+01 | 2.9964790E+01 |

| | A17 | A18 | A19 | A20 |
|---|---|---|---|---|
| 3 | 1.0493455E−04 | −3.8856389E−05 | −2.9252174E−06 | 1.1607213E−06 |
| 4 | −2.4451572E+00 | 1.4253445E+00 | 2.2276164E−01 | −1.4035564E−01 |
| 5 | 1.2131250E−01 | −6.1229519E−01 | 2.6732451E−01 | −3.9200097E−02 |
| 6 | 1.0616062E+01 | −1.7153585E+01 | −4.8561604E+00 | 4.8157558E+00 |
| 8 | 8.9621260E+02 | −2.0388022E+02 | −1.5296300E+02 | 4.7346028E+01 |
| 9 | −6.6131683E+01 | −8.8089448E+01 | 4.2547520E+01 | −3.8361631E+00 |
| 10 | 1.6076027E+01 | −1.1214182E+01 | −2.2772033E+00 | 1.7089802E+00 |

TABLE 4

Example 2·Lens Data

| Si | Ri | Di | Ndj | vdj |
|---|---|---|---|---|
| 1 | 13.59360 | 1.5000 | 1.80400 | 46.58 |
| 2 | 3.19055 | 1.6010 | | |
| *3 | −5.72422 | 0.6410 | 1.53391 | 55.89 |
| *4 | 1.19098 | 1.7000 | | |
| *5 | 2.90193 | 1.6310 | 1.63366 | 23.81 |
| *6 | −3.05749 | 0.1700 | | |
| 7(Aperture) | ∞ | 0.2720 | | |
| *8 | 5.96603 | 0.5200 | 1.63366 | 23.81 |
| *9 | 1.10011 | 1.6250 | 1.53391 | 55.89 |
| *10 | −1.71289 | 1.2492 | | |

TABLE 4-continued

Example 2·Lens Data

| Si | Ri | Di | Ndj | vdj |
|---|---|---|---|---|
| 11 | ∞ | 0.3000 | 1.51680 | 64.20 |
| 12 | ∞ | 0.5201 | | |

*Aspherical Surface

TABLE 5

Example 2·Specs

| | |
|---|---|
| f | 0.854 |
| Bf | 0.520 |
| Fno. | 2.00 |
| 2ω[°] | 195.2 |

TABLE 6

Example 2·Aspherical Surface Data

| Si | KA | A3 | A4 | A5 | A6 |
|---|---|---|---|---|---|
| 3 | 0.0000000E+00 | 2.7408433E−02 | 1.4276878E−01 | −1.4984827E−02 | −1.5419139E−01 |
| 4 | 0.0000000E+00 | −2.0185412E−01 | 5.6150976E−01 | 1.6164178E+00 | −6.0534478E+00 |
| 5 | 0.0000000E+00 | −2.3572560E−02 | 1.1505497E−01 | −7.0514510E−02 | −5.9552322E−01 |
| 6 | 0.0000000E+00 | −4.6627235E−02 | 2.8535707E−01 | −3.3200161E−01 | −4.2872999E−01 |
| 8 | 0.0000000E+00 | −3.6725264E−02 | 3.8856164E−01 | −1.7699636E+00 | 8.4199468E−01 |
| 9 | 0.0000000E+00 | 9.1480347E−01 | −1.7945423E+00 | −2.6246094E+00 | 2.0017792E+01 |
| 10 | 0.0000000E+00 | −2.0312192E−01 | 2.3247253E−01 | 8.8589317E−01 | −9.2492098E−01 |

| | A7 | A8 | A9 | A10 | A11 |
|---|---|---|---|---|---|
| 3 | 7.0244494E−02 | 6.2986897E−02 | −4.6312325E−02 | −1.3281541E−02 | 1.5925359E−02 |
| 4 | 3.6220002E+00 | 1.0195589E+01 | −1.3672043E+01 | −7.1315476E+00 | 1.8709840E+01 |
| 5 | 1.1883434E+00 | 3.2832417E−01 | −2.4481147E+00 | 8.9592652E−01 | 2.0944572E+00 |
| 6 | 1.2610254E+00 | −2.2925737E−01 | −1.6866508E+00 | 1.6452226E+00 | −2.1407779E−01 |
| 8 | 1.9015646E+01 | −4.1995370E+01 | −6.1166943E+01 | 2.7152159E+02 | −4.9176020E+01 |
| 9 | −2.1159225E+01 | −5.6691323E+01 | 1.3306311E+02 | 2.6777844E+01 | −3.0453797E+02 |
| 10 | −4.4599576E+00 | 4.5473606E+00 | 1.1344610E+01 | −1.1948702E+01 | −1.7098966E+01 |

| | A12 | A13 | A14 | A15 | A16 |
|---|---|---|---|---|---|
| 3 | 8.5029332E−04 | −3.2343297E−03 | 2.1548287E−04 | 4.0050408E−04 | −5.8816827E−05 |
| 4 | −6.2152662E−02 | −1.3549153E+01 | 3.2190933E+00 | 5.5147878E+00 | −2.0411218E+00 |
| 5 | −1.1803020E+00 | −1.0053627E+00 | 5.4296295E−01 | 2.5481263E−02 | 5.2959922E−01 |
| 6 | −1.6780978E+00 | 3.0175372E+00 | 1.6307684E−01 | −4.1993464E+00 | 1.4062052E+00 |
| 8 | −7.1030041E+02 | 6.2937035E+02 | 7.5809937E+02 | −1.2067181E+03 | −1.0712020E+02 |

TABLE 6-continued

Example 2•Aspherical Surface Data

| | | | | | |
|---|---|---|---|---|---|
| 9 | 1.7342318E+02 | 2.9820565E+02 | −3.5543637E+02 | −6.3966800E+01 | 2.6138430E+02 |
| 10 | 1.8971494E+01 | 1.4494995E+01 | −1.6880205E+01 | −7.8121845E+00 | 9.4268203E+00 |

| | A17 | A18 | A19 | A20 |
|---|---|---|---|---|
| 3 | −2.6494377E−05 | 5.1799257E−06 | 7.8639549E−07 | −1.8001577E−07 |
| 4 | −1.1909571E+00 | 5.4187852E−01 | 1.0621194E−01 | −5.4610078E−02 |
| 5 | −2.8272494E−01 | −3.6819594E−01 | 3.3340406E−01 | −7.3917590E−02 |
| 6 | 2.5495312E+00 | −1.1817707E+00 | −6.9585464E−01 | 3.8066045E−01 |
| 8 | 8.3868448E+02 | −2.5252844E+02 | −1.5104740E+02 | 6.3583772E+01 |
| 9 | −8.5615681E+01 | −5.8154511E+01 | 4.4781331E+01 | −8.4652997E+00 |
| 10 | 1.9640677E+00 | −2.6468445E+00 | −2.4302511E−01 | 3.2741154E−01 |

TABLE 7

Example 3•Lens Data

| Si | Ri | Di | Ndj | νdj |
|---|---|---|---|---|
| 1 | 13.89916 | 1.5000 | 1.80400 | 46.58 |
| 2 | 3.19055 | 1.6730 | | |
| *3 | −6.71440 | 0.6400 | 1.53391 | 55.89 |
| *4 | 1.33473 | 1.8130 | | |
| *5 | 3.19059 | 1.8570 | 1.63366 | 23.81 |
| *6 | −3.35866 | 0.1830 | | |
| 7(Aperture) | ∞ | 0.3560 | | |
| *8 | 6.70582 | 0.5960 | 1.63366 | 23.81 |
| *9 | 1.16995 | 2.0190 | 1.53391 | 55.89 |
| *10 | −1.61033 | 1.2640 | | |
| 11 | ∞ | 0.3000 | 1.51680 | 64.20 |
| 12 | ∞ | 0.5260 | | |

*Aspherical Surface

TABLE 8

Example 3•Specs

| | |
|---|---|
| f | 0.881 |
| Bf | 0.526 |
| Fno. | 2.00 |
| 2ω[°] | 195.2 |

TABLE 9

Example 3 • Aspherical Surface Data

| Si | KA | A3 | A4 | A5 | A6 |
|---|---|---|---|---|---|
| 3 | 0.0000000E+00 | −2.5356540E−15 | 4.4884911E−01 | −1.9089686E+00 | 4.6425605E+00 |
| 4 | 0.0000000E+00 | −1.2915938E−14 | −3.1257769E+00 | 2.8750054E+01 | −1.1215812E+02 |
| 5 | 0.0000000E+00 | −1.4605980E−15 | −3.8715211E−01 | 3.3062569E+00 | −1.4662931E+01 |
| 6 | 0.0000000E+00 | −6.0626966E−14 | −1.0468178E+00 | 1.4217011E+01 | −8.9560815E+01 |
| 8 | 0.0000000E+00 | 1.1627478E−14 | −2.9968230E−01 | 2.9866529E+00 | −1.1060552E+01 |
| 9 | 0.0000000E+00 | 8.3641964E−01 | −4.0452242E+00 | 1.7076614E+01 | −5.2067075E+01 |
| 10 | 0.0000000E+00 | −3.8954906E−14 | −2.9995316E+00 | 2.6681596E+01 | −1.1522853E+02 |

| | A7 | A8 | A9 | A10 | A11 |
|---|---|---|---|---|---|
| 3 | −6.3916167E+00 | 4.4838113E+00 | −4.9466139E−01 | −1.5707796E+00 | 9.8621932E−01 |
| 4 | 2.3529978E+02 | −2.4443587E+02 | −6.0926705E+00 | 3.4045047E+02 | −3.6248018E+02 |
| 5 | 3.7145916E+01 | −4.7859228E+01 | 7.1473698E+00 | 6.6164259E+01 | −8.0075406E+01 |
| 6 | 3.2162291E+02 | −6.5652197E+02 | 5.7057387E+02 | 4.9454154E+02 | −1.7260445E+03 |
| 8 | −1.5301873E+01 | 2.8505182E+02 | −9.8904101E+02 | 1.2631898E+03 | 6.8111807E+02 |
| 9 | 1.1958839E+02 | −2.2785879E+02 | 3.5922724E+02 | −3.8135757E+02 | 1.2953839E+02 |
| 10 | 2.8692978E+02 | −3.9236135E+02 | 1.5323158E+02 | 3.6720805E+02 | −5.6404916E+02 |

| | A12 | A13 | A14 | A15 | A16 |
|---|---|---|---|---|---|
| 3 | 1.4710763E−02 | −2.2584200E−01 | 6.6630823E−02 | 1.4669859E−02 | −1.1183655E−02 |
| 4 | 3.7123762E+01 | 2.1317612E+02 | −1.5139578E+02 | −8.3620562E+00 | 5.1641518E+01 |
| 5 | 5.8954265E+00 | 5.8386880E+01 | −4.0766149E+01 | −7.0135799E+00 | 1.9773840E+01 |
| 6 | 1.2143854E+03 | 9.0857975E+02 | −1.8597199E+03 | 5.8117221E+02 | 7.0855108E+02 |
| 8 | −3.7896563E+03 | 3.2316264E+03 | 1.6416526E+03 | −4.3841800E+03 | 2.0464893E+03 |
| 9 | 2.3107818E+02 | −3.1565655E+02 | 1.3616987E+02 | −6.6451724E−01 | −2.4725424E+01 |
| 10 | 1.2747636E+02 | 3.4637024E+02 | −2.8442439E+02 | −2.7298568E+01 | 1.2280366E+02 |

| | A17 | A18 | A19 | A20 | A21 | A22 |
|---|---|---|---|---|---|---|
| 3 | 1.2212602E−03 | 4.5852892E−04 | −1.3722561E−04 | 1.0898241E−05 | | |
| 4 | −1.7561840E+01 | −3.2728362E+00 | 3.0039622E+00 | −4.8434700E−01 | | |
| 5 | −6.3429845E+00 | −2.1770986E+00 | 1.7823529E+00 | −3.1772194E−01 | | |

TABLE 9-continued

Example 3 • Aspherical Surface Data

| | | | | | | |
|---|---|---|---|---|---|---|
| 6 | −5.8481038E+02 | 3.3593934E+01 | 9.7647595E+01 | −2.7174494E+01 | | |
| 8 | 8.6876723E+02 | −1.2940620E+03 | 5.7451601E+02 | −1.1189989E+02 | | −7.1764638E+00 |
| 9 | 3.5060080E+01 | −6.1470346E+01 | 8.9730313E+01 | −8.1664300E+01 | 38.508102 | |
| 10 | −4.0155814E+01 | −1.2841512E+01 | 1.0158904E+01 | −1.7009490E+00 | | |

TABLE 10

Example 4•Lens Data

| Si | Ri | Di | Ndj | νdj |
|---|---|---|---|---|
| 1 | 13.87087 | 1.5000 | 1.80400 | 46.58 |
| 2 | 3.19055 | 1.6650 | | |
| *3 | −6.30192 | 0.6400 | 1.53391 | 55.89 |
| *4 | 1.29973 | 1.8670 | | |
| *5 | 2.92887 | 1.8650 | 1.63366 | 23.81 |
| *6 | −3.62426 | 0.1620 | | |
| 7(Aperture) | ∞ | 0.3610 | | |
| *8 | 6.73499 | 0.6080 | 1.63366 | 23.81 |
| *9 | 1.16616 | 2.0060 | 1.53391 | 55.89 |
| *10 | −1.60918 | 1.2599 | | |
| 11 | ∞ | 0.3000 | 1.51680 | 64.20 |
| 12 | ∞ | 0.5180 | | |

*Aspherical Surface

TABLE 11

Example 4•Specs

| | |
|---|---|
| f | 0.870 |
| Bf | 0.518 |
| Fno. | 2.04 |
| 2ω[°] | 194.8 |

TABLE 12

Example 4•Aspherical Surface Data

| Si | KA | A3 | A4 | A5 | A6 |
|---|---|---|---|---|---|
| 3 | 0.0000000E+00 | 2.5413340E−14 | 4.5718049E−01 | −1.9157199E+00 | 4.6564126E+00 |
| 4 | 0.0000000E+00 | −3.2019088E−14 | −3.2547526E+00 | 2.9784949E+01 | −1.1669869E+02 |
| 5 | 0.0000000E+00 | −4.5771789E−15 | −4.6587198E−01 | 3.7164384E+00 | −1.5985340E+01 |
| 6 | 0.0000000E+00 | 8.4396608E−15 | −1.3709913E+00 | 1.9461459E+01 | −1.3045922E+02 |
| 8 | 0.0000000E+00 | −7.7896092E−15 | −2.9836727E−01 | 3.0386736E+00 | −1.1414464E+01 |
| 9 | 0.0000000E+00 | 6.6722959E−13 | 1.3330027E+01 | −1.2351316E+02 | 4.9456150E+02 |
| 10 | 0.0000000E+00 | −1.1502259E−14 | −2.9956393E+00 | 2.6839465E+01 | −1.1625907E+02 |

| Si | A7 | A8 | A9 | A10 | A11 |
|---|---|---|---|---|---|
| 3 | −6.4254496E+00 | 4.5154429E+00 | −4.9784677E−01 | −1.5846955E+00 | 9.9432049E−01 |
| 4 | 2.4680276E+02 | −2.5868779E+02 | −6.4220038E+00 | 3.6540245E+02 | −3.9089454E+02 |
| 5 | 4.0539338E+01 | −5.3391795E+01 | 9.2256323E+00 | 7.5438089E+01 | −9.5084972E+01 |
| 6 | 5.0087988E+02 | −1.0915604E+03 | 1.0048731E+03 | 9.4723727E+02 | −3.4509758E+03 |
| 8 | −1.5729957E+01 | 2.9706685E+02 | −1.0391742E+03 | 1.3382934E+03 | 7.2415069E+02 |
| 9 | −7.0286524E+02 | −1.5405156E+03 | 8.2570154E+03 | −1.3703803E+04 | 5.8950700E+03 |
| 10 | 2.8961691E+02 | −3.9601263E+02 | 1.5493619E+02 | 3.7106486E+02 | −5.7207657E+02 |

| Si | A12 | A13 | A14 | A15 | A16 |
|---|---|---|---|---|---|
| 3 | 1.5464382E−02 | −2.2804164E−01 | 6.7217047E−02 | 1.4835136E−02 | −1.1305362E−02 |
| 4 | 3.9489503E+01 | 2.3304431E+02 | −1.6612716E+02 | −9.2618848E+00 | 5.7430212E+01 |
| 5 | 8.4873147E+00 | 7.1213359E+01 | −5.1099489E+01 | −8.9545557E+00 | 2.5460103E+01 |
| 6 | 2.5431069E+03 | 2.0555780E+03 | −4.4241114E+03 | 1.5064324E+03 | 1.8720783E+03 |
| 8 | −4.0601804E+03 | 3.4669409E+03 | 1.7998384E+03 | −4.7555354E+03 | 2.2013400E+03 |
| 9 | 1.3009042E+04 | −2.0649316E+04 | 6.7256385E+03 | 9.1275875E+03 | −9.3914920E+03 |
| 10 | 1.3067348E+02 | 3.5220155E+02 | −2.9036856E+02 | −2.7796435E+01 | 1.2578790E+02 |

| Si | A17 | A18 | A19 | A20 |
|---|---|---|---|---|
| 3 | 1.2368133E−03 | 4.6395458E−04 | −1.3918296E−04 | 1.1082148E−05 |
| 4 | −1.9734601E+01 | −3.6611382E+00 | 3.4221012E+00 | −5.5919999E−01 |
| 5 | −8.0817296E+00 | −2.9527715E+00 | 2.3470173E+00 | −4.1197000E−01 |
| 6 | −1.7145247E+03 | 1.4283854E+02 | 3.2482335E+02 | −1.0429869E+02 |
| 8 | 9.5225395E+02 | −1.4084477E+03 | 6.3720572E+02 | −1.2948054E+02 |
| 9 | 1.6239195E+03 | 1.8949671E+03 | −1.1180157E+03 | 1.8851222E+02 |
| 10 | −4.1066515E+01 | −1.3242816E+01 | 1.0414905E+01 | −1.7360050E+00 |

TABLE 13

Example 5·Lens Data

| Si | Ri | Di | Ndj | νdj |
|---|---|---|---|---|
| 1 | 13.87087 | 1.5000 | 1.80401 | 46.58 |
| 2 | 3.19055 | 1.7070 | | |
| *3 | −6.53850 | 0.6410 | 1.53391 | 55.89 |
| *4 | 1.36448 | 1.7890 | | |
| *5 | 2.97072 | 1.8550 | 1.63366 | 23.81 |
| *6 | −3.50252 | 0.1600 | | |
| 7(Aperture) | ∞ | 0.3600 | | |
| *8 | 6.13701 | 0.6220 | 1.63366 | 23.81 |
| *9 | 1.16669 | 2.0300 | 1.53391 | 55.89 |
| *10 | −1.66255 | 0.9579 | | |
| 11 | ∞ | 0.7000 | 1.51680 | 64.20 |
| 12 | ∞ | 0.5100 | | |

*Aspherical Surface

TABLE 14

Example 5·Specs

| | |
|---|---|
| f | 0.909 |
| Bf | 0.510 |
| Fno. | 2.01 |
| 2ω[°] | 195.4 |

TABLE 15

Example 5·Aspherical Surface Data

| Si | KA | A3 | A4 | A5 | A6 |
|---|---|---|---|---|---|
| 3 | 0.0000000E+00 | 5.1406697E−15 | 4.3815948E−01 | −1.9504225E+00 | 4.7860818E+00 |
| 4 | 0.0000000E+00 | 3.2190775E−14 | −3.2212724E+00 | 2.9854774E+01 | −1.1798896E+02 |
| 5 | 0.0000000E+00 | 3.0285671E−15 | −4.2775342E−01 | 3.6354929E+00 | −1.5856046E+01 |
| 6 | 0.0000000E+00 | 5.9843762E−14 | −1.3262175E+00 | 1.9499762E+01 | −1.3102169E+02 |
| 8 | 0.0000000E+00 | −1.4712305E−15 | −2.3918525E−01 | 3.0120493E+00 | −1.1911792E+01 |
| 9 | 0.0000000E+00 | −3.0796305E−13 | 1.3518279E+01 | −1.2476856E+02 | 5.0138609E+02 |
| 10 | 0.0000000E+00 | 1.1532521E−14 | −3.0383087E+00 | 2.7043989E+01 | −1.1683758E+02 |

| Si | A7 | A8 | A9 | A10 | A11 |
|---|---|---|---|---|---|
| 3 | −6.6002753E+00 | 4.6419930E+00 | −5.1332013E−01 | −1.6415113E+00 | 1.0358625E+00 |
| 4 | 2.5058868E+02 | −2.6269138E+02 | −7.7210604E+00 | 3.7282634E+02 | −3.9742959E+02 |
| 5 | 3.9932875E+01 | −5.2024768E+01 | 8.8760057E+00 | 7.3017097E+01 | −9.2392915E+01 |
| 6 | 5.0062628E+02 | −1.0875169E+03 | 1.0054821E+03 | 9.3151365E+02 | −3.4515361E+03 |
| 8 | −1.5148815E+01 | 2.9736299E+02 | −1.0292480E+03 | 1.3072240E+03 | 7.2330152E+02 |
| 9 | −7.1577200E+02 | −1.5685356E+03 | 8.4361989E+03 | −1.4030904E+04 | 6.0418885E+03 |
| 10 | 2.9113055E+02 | −3.9887761E+02 | 1.5670486E+02 | 3.7448711E+02 | −5.7830318E+02 |

| Si | A12 | A13 | A14 | A15 | A16 |
|---|---|---|---|---|---|
| 3 | 1.5183648E−02 | −2.3937583E−01 | 7.1026962E−02 | 1.5680409E−02 | −1.2025987E−02 |
| 4 | 3.9270605E+01 | 2.3778002E+02 | −1.6958502E+02 | −9.2536087E+00 | 5.8800796E+01 |
| 5 | 8.8876124E+00 | 6.8902819E+01 | −4.9833981E+01 | −8.6356704E+00 | 2.4694130E+01 |
| 6 | 2.5798175E+02 | 2.0553850E+03 | −4.4772848E+03 | 1.5072838E+03 | 1.9188399E+03 |
| 8 | −3.9663551E+03 | 3.3850125E+03 | 1.7313642E+03 | −4.6343145E+03 | 2.1769982E+03 |
| 9 | 1.3384738E+04 | −2.1278848E+04 | 6.9427148E+03 | 9.4486542E+03 | −9.7449870E+03 |
| 10 | 1.3186639E+02 | 3.5676976E+02 | −2.9381280E+02 | −2.8411530E+01 | 1.2750075E+02 |

| Si | A17 | A18 | A19 | A20 |
|---|---|---|---|---|
| 3 | 1.3203990E−03 | 4.9752629E−04 | −1.4959526E−04 | 1.1930359E−05 |
| 4 | −2.0392114E+01 | −3.7193133E+00 | 3.5441026E+00 | −5.8484857E−01 |
| 5 | −7.7355315E+00 | −2.8850928E+00 | 2.2362121E+00 | −3.8466392E−01 |
| 6 | −1.7152343E+03 | 1.2004425E+02 | 3.2503873E+02 | −9.9595207E+01 |
| 8 | 9.1514889E+02 | −1.3817425E+03 | 6.2466320E+02 | −1.2523781E+02 |
| 9 | 1.6911243E+03 | 1.9749564E+03 | −1.1689362E+03 | 1.9771563E+02 |
| 10 | −4.1619969E+01 | −1.3437408E+01 | 1.0583008E+01 | −1.7684202E+00 |

TABLE 16

| Conditional Expression | | Example 1 | Example 2 | Example 3 | Example 4 | Example 5 |
|---|---|---|---|---|---|---|
| (1) | R9/f | 1.45 | 1.29 | 1.33 | 1.34 | 1.28 |
| (2) | f1/f | −6.34 | −6.49 | −6.24 | −6.32 | −6.05 |
| (3) | f2/f | −2.55 | −2.09 | −2.30 | −2.25 | −2.26 |
| (4) | f3/f | 3.89 | 3.08 | 3.29 | 3.30 | 3.14 |
| (5) | f4/f | −2.96 | −2.60 | −2.65 | −2.67 | −2.63 |
| (6) | f5/f | 1.99 | 1.84 | 1.93 | 1.95 | 1.88 |
| (7) | f123/f45 | 1.27 | 0.81 | 0.96 | 0.93 | 0.93 |
| (8) | α | 7.0 | 10.6 | 10.3 | 10.3 | 12.2 |
| (8) | β | 5.4 | 5.9 | 5.2 | 5.2 | 4.4 |
| (9) | θ | 13.1 | 2.1 | 7.0 | 6.1 | 4.8 |
| (10) | R2/f | 3.70 | 3.74 | 3.62 | 3.67 | 3.51 |
| (11) | D2/f | 1.69 | 1.87 | 1.90 | 1.91 | 1.88 |
| (12) | D4/f | 2.27 | 1.99 | 2.06 | 2.15 | 1.97 |
| (13) | SL/f | 5.81 | 5.13 | 5.63 | 5.69 | 5.44 |
| (14) | γ | 34.1 | 34.8 | 33.0 | 33.1 | 32.7 |
| (15) | Nd1 | 1.77250 | 1.80400 | 1.80400 | 1.80400 | 1.80400 |
| (16) | νd1 | 49.60 | 46.58 | 46.58 | 46.58 | 46.58 |
| | P1 | 0.91 | 0.88 | 0.97 | 0.99 | 0.95 |
| | P2 | 1.97 | 2.50 | 2.26 | 2.29 | 2.34 |

A to D of FIG. 10 are aberration diagrams of spherical aberration, astigmatism, distortion, and lateral chromatic aberration of the imaging lens of Example 1. Each aberration diagram of spherical aberration, astigmatism (field curvature), and distortion, shows aberrations with the d-line (wavelength 587.56 nm) as the reference wavelength. The spherical aberration diagram and the lateral chromatic aberration diagram also show aberrations with respect to the F-line (wavelength 486.1 nm) and C-line (wavelength 656.27 nm). In the astigmatism diagram, the solid line illustrates astigmatism in the sagittal direction (S) while the dotted line illustrates astigmatism in the tangential direction (T). The "Fno." represents the F-number and the "ω" represents the half angle of view.

Figure 14:
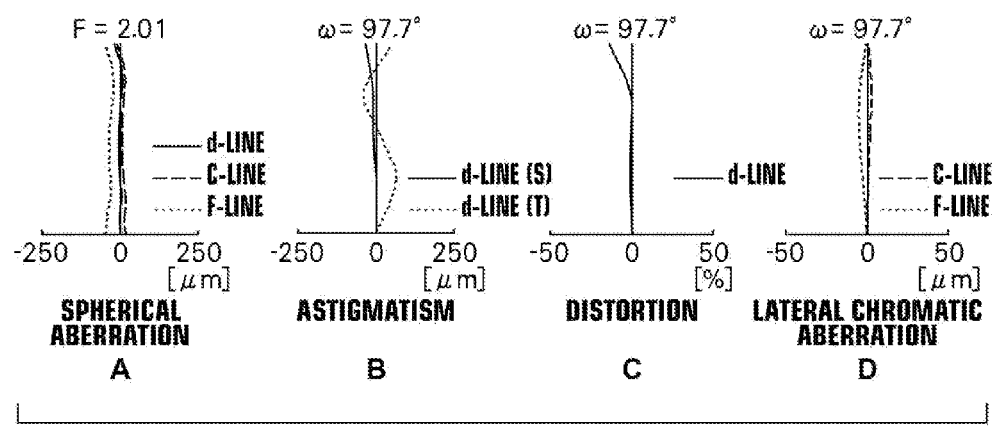

Likewise, various types of aberrations of Example 2 to 5 are shown in A to D of FIG. 11 to A to D of FIG. 14.

As is known from each numerical data and each aberration diagram, the downsizing, increased angle, and improved performance have been achieved in each example, while each example is made a brighter lens.

The imaging lens of the present invention is not limited to the aforementioned embodiments and examples, and various modifications may be made. For example, the values of radius of curvature of each lens element, surface distance, refractive index, Abbe number, aspherical surface coefficient, and the like are not limited to those shown in each example and may take other values.

Further, each example is described on the assumption that the imaging lens is used as a fixed focus lens, but the imaging lens may take a focus adjustable configuration. For example, a configuration may be adopted in which the entire lens system is drawn out forward or some of the lenses are moved along the optical axis to allow auto focusing.

[Embodiment of Imaging Apparatus]

Figure 15:
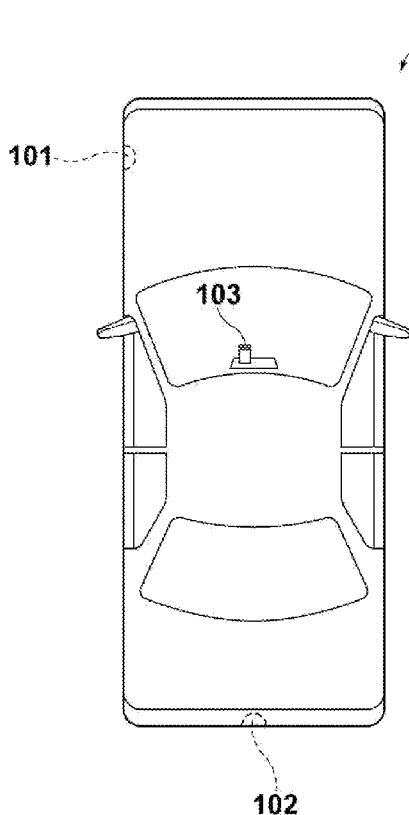
FIG. 15 is a drawing for explaining the locations of vehicle mounted imaging apparatuses according to an embodiment of the present invention.

FIG. 15 illustrates, as a use example, how imaging apparatuses equipped with the imaging lens of the present embodiment are mounted on an automobile 100. In FIG. 15, the automobile 100 has a vehicle exterior camera 101 for imaging the dead area on the side of the passenger side, a vehicle exterior camera 102 for imaging the dead area on the rear side of the automobile 100, and vehicle interior camera 103 attached to the rear surface of the rearview mirror to image the same visual field range as that of the driver. The vehicle exterior camera 101, the vehicle exterior camera 102, and the vehicle interior camera 103 are imaging apparatuses according to an embodiment of the present invention, and each includes an imaging lens of an example of the present invention and an image sensor that converts an optical image formed by the imaging lens to an electrical signal.

As the image lens according to an example of the present invention has the aforementioned advantages, the vehicle exterior camera 101, the vehicle exterior camera 102, and the vehicle interior camera 103 can also be constructed compact and inexpensively, have a wide angle of view, and obtain a good image to the periphery of the imaging area.

So far the present invention has been described by way of embodiments and examples, but the present invention is not limited to the aforementioned embodiments and examples and various modifications may be made. For example, the values of radius of curvature of each lens element, surface distance, refractive index, Abbe number, and the like are not limited to those shown in each example and may take other values.

In the embodiment of the imaging apparatus, the description has been made of a case in which the present invention is applied to a vehicle camera with reference to a drawing, but the present invention is not limited to such an application and may be applied, for example, to surveillance cameras, mobile terminal cameras, and the like.

What is claimed is:

1. A wide-angle imaging lens composed of a first lens having a negative meniscus shape with a convex surface on the object side, a negative second lens, a positive third lens, an aperture stop, a negative fourth lens, and a positive fifth lens disposed in order from the object side, wherein the fourth lens and the fifth lens are cemented with an interface which is convex on the object side and has an aspherical shape, and the imaging lens satisfies conditional expressions given below:

$$1.0 < R9/f \tag{1}$$

$$1.5 < D2/f < 2.1 \tag{11-1}$$

where:
R9: the radius of curvature of the interface,
f: the focal length of the entire system, and
D2: the distance between the first lens and the second lens on the optical axis.

2. The wide-angle imaging lens as claimed in claim 1, wherein the imaging lens satisfies a conditional expression given below:

$$-10 < f1/f < -4.0 \tag{2}$$

where:
f1: the focal length of the first lens
f: the focal length of the entire system.

3. The wide-angle imaging lens as claimed in claim 1, wherein the imaging lens satisfies a conditional expression given below:

$$-3.0 < f2/f < -1.5 \tag{3}$$

where:
f2: the focal length of the second lens
f: the focal length of the entire system.

4. The wide-angle imaging lens as claimed in claim 1, wherein the imaging lens satisfies a conditional expression given below:

$$2.5 < f3/f < 4.0 \tag{4}$$

where:
f3: the focal length of the third lens
f: the focal length of the entire system.

5. The wide-angle imaging lens as claimed in claim 1, wherein the imaging lens satisfies a conditional expression given below:

$$-3.4 < f4/f < -2.0 \tag{5}$$

where:
f4: the focal length of the fourth lens
f: the focal length of the entire system.

6. The wide-angle imaging lens as claimed in claim 1, wherein the imaging lens satisfies a conditional expression given below:

$$1.5 < f5/f < 2.5 \tag{6}$$

where:
f5: the focal length of the fifth lens
f: the focal length of the entire system.

7. The wide-angle imaging lens as claimed in claim 1, wherein the imaging lens satisfies a conditional expression given below:

$$0.0 < f123/f45 < 10.0 \tag{7}$$

where:
f123: the combined focal length of the first to the third lenses
f45: the combined focal length of the fourth and the fifth lenses.

8. The wide-angle imaging lens as claimed in claim 1, wherein the third lens has a biconvex shape.

9. The wide-angle imaging lens as claimed in claim 1, wherein the fourth lens has a meniscus shape.

10. The wide-angle imaging lens as claimed in claim 1, wherein the fifth lens has a biconvex shape.

11. The wide-angle imaging lens as claimed in claim 1, wherein a normal to the object side surface of the second lens at a point on the surface where the outermost ray of the center light beam passes through the surface is parallel to the optical axis or intersects with the optical axis on the object side of the surface.

12. The wide-angle imaging lens as claimed in claim 1, wherein, if the absolute value of narrow side angle between a normal to the image side surface of the second lens at a point on the surface where an upper ray of the outermost light beam passes through the surface and a normal to the surface at a point on the surface where the principal ray of the outermost light beam passes through the surface is taken as $\alpha$, and the absolute value of narrow side angle between the normal to the surface at the point on the surface where the principal ray of the outermost light beam passes through the surface and a normal to the surface at a point on the surface where a lower ray of the outermost light beam passes through the surface is taken as $\beta$, each of the three normals intersects with the optical axis on the image side of the surface, and the imaging lens satisfies a conditional expression given below:

$$\alpha > \beta \tag{8}$$

13. The wide-angle imaging lens as claimed in claim 1, wherein a normal to the object side surface of the third lens at a point on the surface where a lower ray of the outermost light beam passes through the surface and a normal to the surface at a point on the surface where an upper ray of the outermost light beam passes through the surface intersect with each other on the image side of the surface.

14. The wide-angle imaging lens as claimed in claim 1, wherein, if a point where a normal to the interface between the fourth and fifth lenses at a point on the interface where the principal ray of the outermost light beam passes through the interface intersects with the optical axis is taken as P1 and a point where a normal to the interface at a point on the interface where the upper ray of the outermost light beam passes through the interface intersects with the optical axis is taken as P2, the point P2 intersects with the optical axis on the image side of the point P1 and, if the absolute value of narrow side angle between the two normals is taken as $\theta$, the imaging lens satisfies a conditional expression given below:

$$\theta < 20° \tag{9}$$

15. The wide-angle imaging lens as claimed in claim 1, wherein the imaging lens satisfies a conditional expression given below:

$$2.0 < R2/f \tag{10}$$

where:
R2: the radius of curvature of the image side surface of the first lens
f: the focal length of the entire system.

16. The wide-angle imaging lens as claimed in claim 1, wherein the imaging lens satisfies a conditional expression given below:

$$1.2 < D4/f < 2.8 \tag{12}$$

where:
D4: the distance between the second lens and the third lens on the optical axis
f: the focal length of the entire system.

17. The wide-angle imaging lens as claimed in claim 1, wherein the imaging lens satisfies a conditional expression given below:

$$4.0 < SL/f \tag{13}$$

where:
SL: the distance from the image plane to the aperture stop on the optical axis (the distance from the fifth lens to the image plane is air equivalent distance)
f: the focal length of the entire system.

18. The wide-angle imaging lens as claimed in claim 1, wherein the imaging lens satisfies a conditional expression given below:

$$\gamma < 35° \tag{14}$$

where
$\gamma$: the angle between the principal ray of the outermost light beam passing through the plane of the aperture stop and the optical axis.

19. An imaging apparatus equipped with the wide-angle imaging lens as claimed in claim 1.

* * * * *